June 1, 1965 L. D. BARRY 3,186,493

AUTOMATIC FARMING SYSTEM

Filed May 6, 1959 8 Sheets-Sheet 1

INVENTOR.

Leonard D. Barry

June 1, 1965 L. D. BARRY 3,186,493

AUTOMATIC FARMING SYSTEM

Filed May 6, 1959 8 Sheets-Sheet 2

INVENTOR.

Leonard D. Barry

June 1, 1965 L. D. BARRY 3,186,493

AUTOMATIC FARMING SYSTEM

Filed May 6, 1959 8 Sheets-Sheet 3

INVENTOR.

Leonard D. Barry

June 1, 1965 L. D. BARRY 3,186,493

AUTOMATIC FARMING SYSTEM

Filed May 6, 1959 8 Sheets-Sheet 4

INVENTOR.

Leonard D. Barry

June 1, 1965 L. D. BARRY 3,186,493

AUTOMATIC FARMING SYSTEM

Filed May 6, 1959 8 Sheets-Sheet 5

INVENTOR.

Leonard D. Barry

AUTOMATIC FARMING SYSTEM

Filed May 6, 1959

8 Sheets-Sheet 6

INVENTOR.

Leonard D. Barry

INVENTOR.
Leonard D. Barry

AUTOMATIC FARMING SYSTEM

Filed May 6, 1959 8 Sheets-Sheet 8

INVENTOR.

Leonard D. Barry 3,186,493
AUTOMATIC FARMING SYSTEM
Leonard D. Barry, 19300 Pennington Drive, Detroit, Mich.
Filed May 6, 1959, Ser. No. 811,500
22 Claims. (Cl. 172—26)

This invention relates to farming systems and devices and in particular to novel means whereby farming implements can be automatically propelled, guided, and controlled while tilling or otherwise functioning on the land.

An object of this invention is to provide a practical and novel system and devices for automatically tilling a field.

Another object is to provide novel means to automatically guide a device in a succession of rows across or along a field.

Another object is to provide a tilling device that automatically moves back and forth between limits of travel and indexes to follow a parallel path selectably at one or both limits of travel for respectively use with one and two-way implements.

A further object is to provide novel means on the tilling device for lifting, lowering, and holding implements level and in particular for backing out and controlling the depth and angle of a plow bottom whereby plowing can be automatically accomplished.

A further object is to provide a tiller which not only is steered automatically on a field, but one which can be manually steered for operation to operating position or on roads, and further to provide a tractor which can be either manually or automatically steered according to the type of work being done to enable the tiller to do all the jobs of a farm tractor as well as automatic cultivation.

It is an object to provide novel guide and steering arrangements and control means to reverse the tiller without reversing the direction of rotation of its drive to enable utilization of a simple drive and to simplify steering requirements for automatic operation. It is therefore an object to provide separate implement lifts for right and left hand implements and for the lowering of one implement lift only when the vehicle operates in one direction and the lowering of the other implement lift only when the tiller operates in the reverse direction during tilling and to hold the implements out of the ground while the tiller is indexing and moving to working position.

One embodiment of this invention utilizes a bridge type structure to carry and guide an implement car back and forth thereon. With such a structure it is an object to support the bridge at its ends on swivel casters whereby it can be moved endwise to span different runs across the field and moved to and from the field easily. It is another object to support the bridge on pivoted trucks whereby it is pivoted from one run to another without requiring that the implements be reversed or lifted.

Another object is to provide a farming device having means whereby it is accurately and automatically guided to make straight rows, space rows equally or as set, and retrace over straight and certain curved rows with precision enabling thereby the use of tilling devices, including harvesting devices for produce crops, which require greater precision in row alignment. It is a further object to layout and retrace both rows and crossrows unattended in operation.

A further object is to provide novel drive systems and controls for propelling and controlling farming devices according to this invention.

The first form of this invention to be described briefly comprises a bridge structure supported on rails by swivel powered casters at the ends of the bridge, a car arranged to move back and forth across the bridge, and means on the car for supporting an implement in operable relation to the ground. As a feature of the controls the bridge is controlled as set up by the operator to index when the car reaches either or both ends of the bridge or for tilling in cross-rows, is set up to move continuously with the car stationary with respect to the bridge until an index control located on the ground causes the car to index along the bridge. As a further feature the implements are automatically lifted while the bridge is indexed with the car at the end of the bridge, while the bridge is moving from one run to another or on a turn-around, whenever the bridge is not spanning a run across the field, and when the direction of an implement is not proper for the direction of travel of the car or the bridge that implement is automatically held lifted provided the operator properly sets up the tiller for operation.

Other and further features and objects of this invention will be apparent to those skilled in the art upon consideration of the specific embodiments described hereinafter and illustrated in the accompanying drawings wherein.

Figures 26, 27:
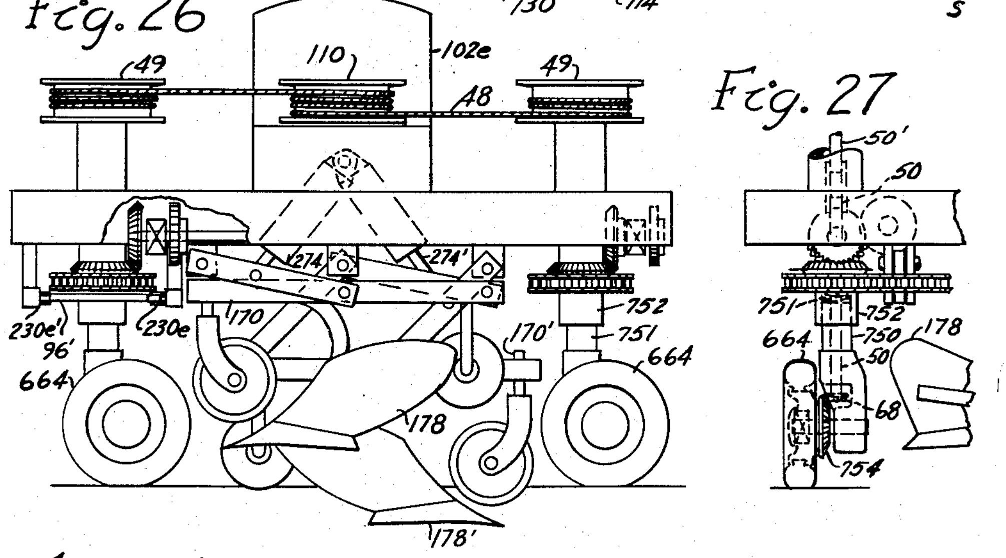
FIGURE 26 is a side elevation of the tiller of FIGURE 22.
FIGURE 27 is a front elevation of a portion of the tiller shown in FIGURE 26.

Referring to the drawings and in particular to FIGURES 1, 2, 3, and 4; a bridge tiller 28 has a frame or bridge span 30 supported on trucks 32 and 34 to run on parallel rails 36 and 38 respectively. Truck 34 is rigidly bolted to the bridge with bolts 40 whereby it can be adjusted to the track gage or replaced by another truck. Truck 32 is hinged to bridge 30 on pivots 42 to compensate for variation in track gage and held vertical by spring stops 43 which limit the movement of truck 32 on pivots 42. Each truck is supported on and driven through two pivoted wheel assemblies or swivel casters 44 each having a thrust bearing 66 for supporting the truck. The wheel 46 of each caster 44 is driven by endless cable 48 wrapped around four cable drums 49 each secured on a vertical shaft 50 secured in bearings 54 to the frame of the truck. A collar 60 supports each shaft 50 on a bearing 54. Each shaft 50 extends down into a caster 44 on the swivel axis of the caster. The hub of a beveled gear 68 secured to the bottom of shaft 50 and supporting a radial and thrust bearing 70 against the underside of the caster together with collar 60 holds the caster to the truck frame. Beveled gear 72 meshing beveled gear 68 and secured on shaft 74 bearing in the caster frame parallel with the shaft 76 on which wheel 46 revolves drives sprocket 77 secured on shaft 74 which in turn drives sprocket 78 on wheel 46 through chain 80. The caster drive shown in FIGURE 27 is equally applicable.

Wheels 46 preferably are equipped with rubber tires 82 having a groove 84 which fits over the angle rail 36 or 38. The rubber tire is recessed so that the center of the groove does not bear on the rail. Webs 85 prevent the tire from excessive spreading. The tread sides of the groove 84 forms an angle less than 90 degrees to make good contact when under load on the 90 degree structural angle rail and provide good traction. The tires can be changed easily if necessary by removing bolts 86 which secure disk 87 against the outer side of the tire and wheel, shaft 76 being securely held in hole 88 on only one side of the swivel base 90.

Each caster has a sprocket tooth rack 92 wrapped around the base of the wheel support bracket 90 and secured thereto or cast as a part thereof. A chain 94 around the sprockets 92 join in alignment the two swivel brackets 90 on each end of the tiller so that the casters on each truck will turn together with their wheels in the same direction.

Figure 24:
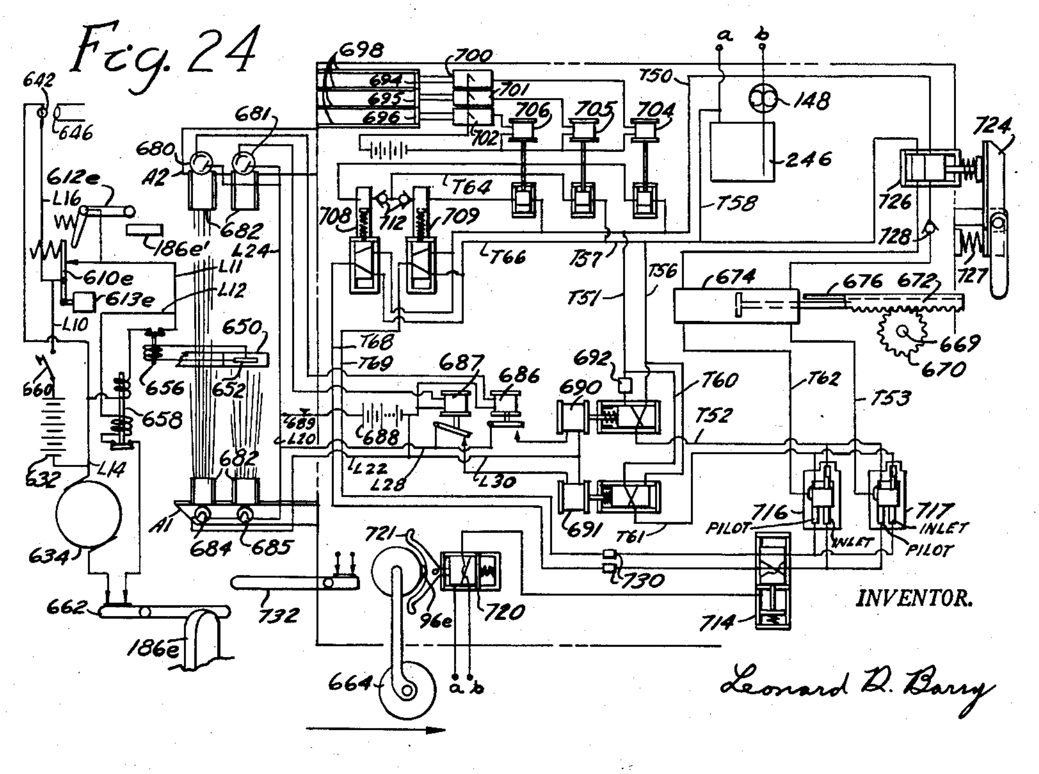
FIGURE 24 is a schematic diagram of the controls for the tiller shown in FIGURE 22.
Figure 29:
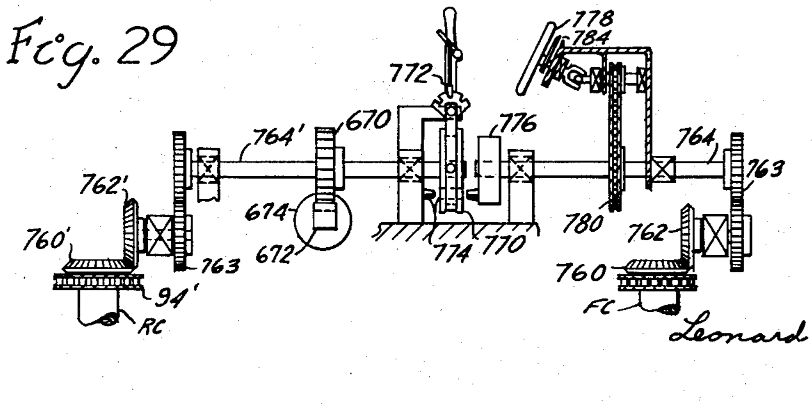
FIGURE 29 is a schematic diagram of the preferred steering arrangement for combining manual and automatic steering.

It may be desirable to connect the casters on opposite ends of the tiller to swivel together depending on how the casters are guided. If a full track is provided as shown the connection is not needed unless used to throw switches along the trackway. To provide this connection a sprocket 97 meshes chain 94 on each end, the sprockets 97 on each end are turned together by movement of either through beveled gears and shafting 98 and including flexible shafting 99 to connect to the hinged truck as shown. By adding control over steering as illustrated in FIGURES 24 and 29 for example the bridge tiller can operate for a straight run and index and make a second run without rails as guides. If the tiller of FIGURE 24 were the bridge, the implement car would travel back and forth at right angles to the direction of the arrow between indexing movements of the bridge in the direction of the arrow.

Within bridge 30 a second frame 100 resiliently supports a motor or engine 102 complete with its cooling, lubricating, fuel, and electrical systems. A governor 103 controls the speed of the engine. Frame 100 is supported from bridge 30 near the ends thereof by rods 104 secured or hooked to the frame and bridge preferably with resilient washers or springs 106 thereon to cushion vibrations still further. The inner frame is likewise held from lengthwise and crosswise movement to the bridge. Frame 100 also supports fuel tank 108, caster drive cable drum 110, speed reducer 112, the engine transmission 114, a track comprising channel rails or guides 116 and 118 with farm implement car or carrier 120 therebetween, car control linkage 122, implement lift control linkage 124, and power takeoff 126 and shafting 127 which drives speed reducer 128 located on truck 34 through universal joint 129.

A cable drive drum 130 for supplying power to car 120 is continuously driven in one direction by engine 102 through speed reducer 128 during operation of the tiller. About drum 130 is wrapped a few turns of an endless drive cable 132 which extends to the opposite track 32 and is tensioned and directed back along the desired line of travel by sheaves 134.

Figures 5, 6, 7, 8, 9, 10:
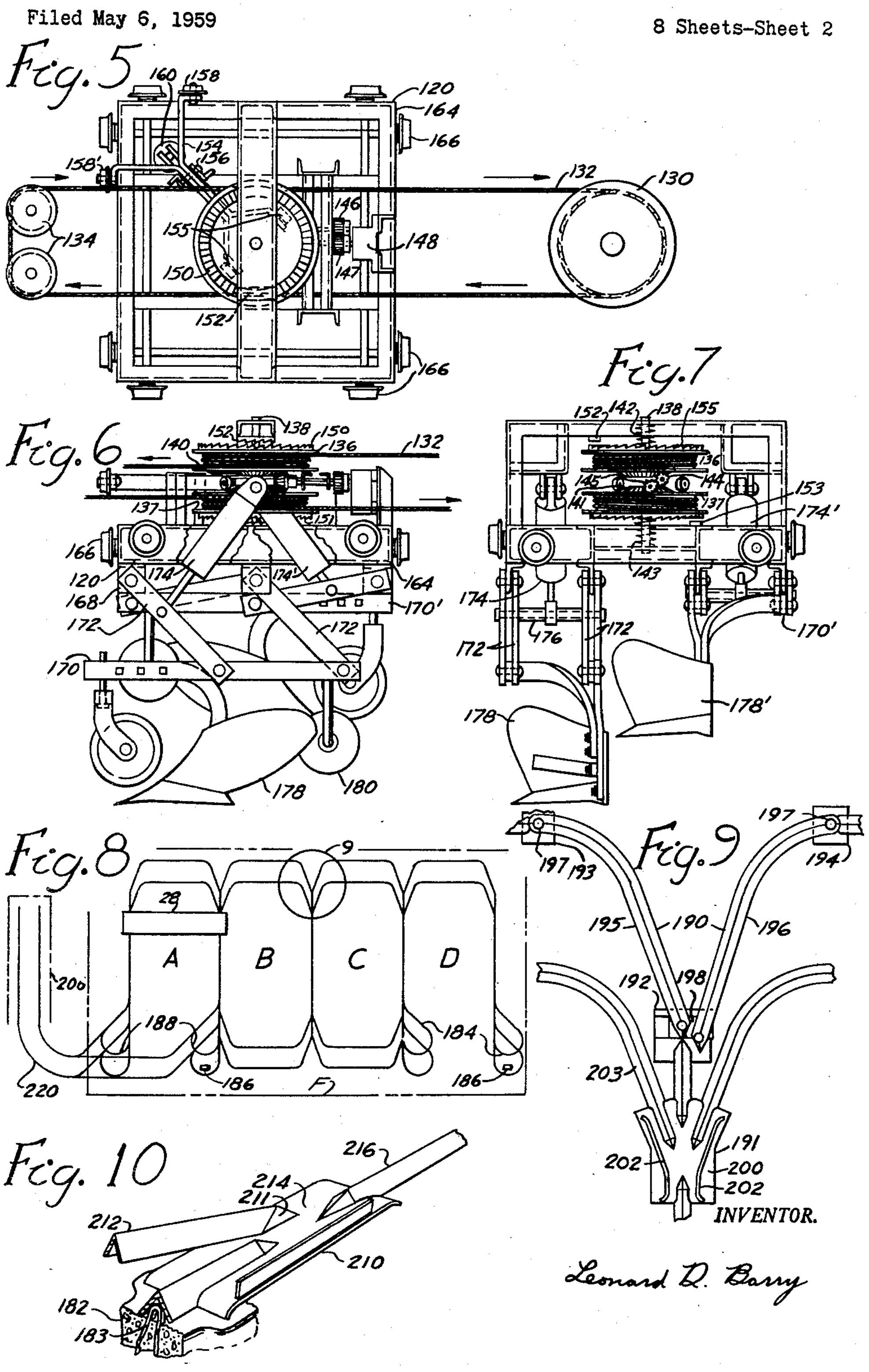
FIGURE 5 is a plan view of the implement car and its drive.
FIGURE 6 is a side view of the car and drive with implements in place.
FIGURE 7 is an end view of the car and implements.
FIGURE 8 is a track layout for the tiller.
FIGURE 9 is a track switch detail enlarged from area 9 circled in FIGURE 8.
FIGURE 10 is a perspective view of a turning switch in the track.

FIGURES 5, 6, and 7 are referred to for details of car 120 and its endless cable drive. Cable drums 136 and 137 normally free to revolve and have axial movement on vertical shaft 138, which is secured to car 120, have the desired number of turns of different sides of the cable 132 wrapped thereon in the same direction whereby the cable turns the drums in the same direction. The cable leaves drive drum 130, wraps first around drum 136, then on to direction changing pulleys 134 and back to and around drum 137 and on to the drive drum 130.

The facing flanges of drums 136 and 137 have beveled gears 140 and 141 secured respectively thereto which engage under the force of springs 142 and 143 with beveled gears 144 and 145 respectively. Beveled gears 144 and 145 are connected through reverse gears 146 and 147 so that either or both beveled gears 144 and 145 drive hydraulic pump 148 located on the car. The opposite flanges of drums 136 and 137 have secured thereto clutch faces 150 and 151 respectively which engage respectively clutch plates 152 and 153 mounted in line with the line of pull of the cable on the frame of car 120 to lock either drum to the frame without horizontal torque on the cable drums 136 and 137 when either is engaged with the frame. The clutch of either drum 136 or 137 is caused to engage its clutch plate to stop the cable side relative to the car and thereby move the car along the bridge in a direction depending on which cable drum is engaged with the car frame through its locking clutch. To insure that only one drum is locked at a time lock yoke 154, provided with two wheels 155 which roll on the facing flanges of cable drums 136 and 137, is pivoted at 156 on an axis in the plane of the flange faces, and the other end of this yoke lever is provided with two wheels 158 and 158' each on a forked branch of yoke 154 held outward of adjacent sides of the cam frame for rotation parallel to the plane of the side that they extend beyond. Hydraulic cylinder 160 is connected to actuate yoke 154 to force the wheel 158, which turns in a plane lengthwise the bridge, to engage either the lower rail 162 or the upper rail 163 of linkage 122, in FIGURE 11. Thus cylinder 160 and linkage 122 control the position of yoke 154 which engages either or neither drum with the frame according to the vertical position of wheel 158.

Figures 1, 2:
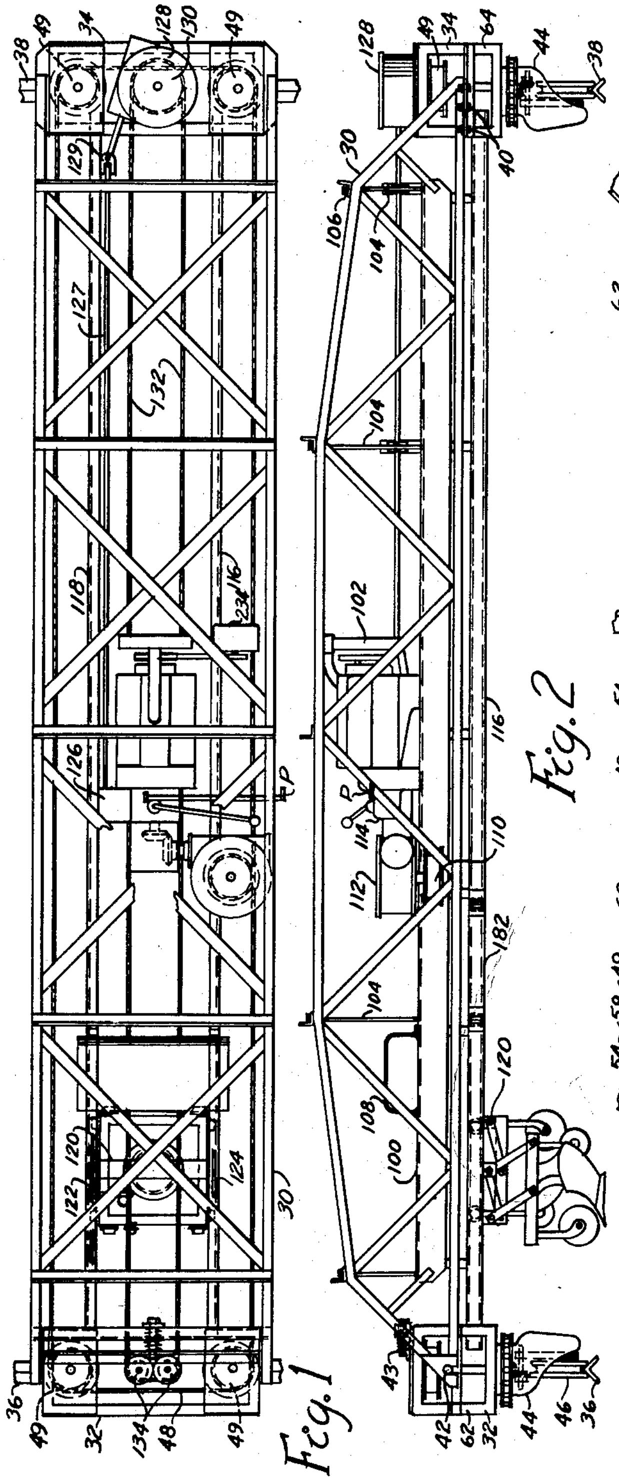
FIGURE 1 is a plan view of the bridge form of the tiller shown on a guide track.
FIGURE 2 is a side view of the tiller shown in FIGURE 1.
Figures 3, 4:
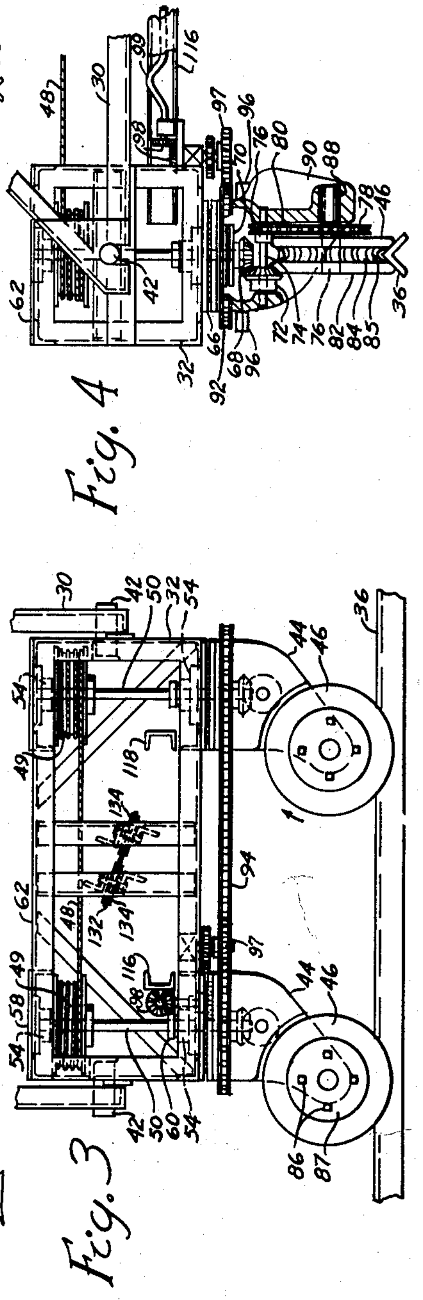
FIGURE 3 is a partial end view of the tiller shown in FIGURE 1 drawn to a larger scale than FIGURES 1 and 2 and showing the side of a caster truck supporting the bridge.
FIGURE 4 is an end view of the truck shown in FIGURE 3 with a portion of the bridge.

As seen in plan view, FIG. 5, the car has a square frame 164 of channel iron. Eight wheels 166 are mounted two on each side to run between the channel rails 116 and 118 lengthwise the bridge. Both sets of opposite car wheels 166 fit in and between channels 116 and 118 whereby transverse plowing (along the length of the bridge, i.e. from rail to rail) or longitudinal plowing (parallel to the rails) can be achieved according to which way the car is turned before inserting it between the channels. A section of channel 182, FIGURE 2, is bolted in place whereby the car can be removed from the channel rails, turned 90 or 270 degrees, and inserted back between the channels. For this reason the car is provided with a square frame and wheels on all sides, otherwise the implement would need to be unfastened and turned or a turntable provided on the car for the implement lift. Eight implement supporting brackets 168 are bolted to and extend below the frame. An implement frame or beam 170 is supported on four parallel bars 172 each pivotally joined at one end to the implement frame and at the other end each to a bracket 168 and arranged to enable parallelogram movement. Piston cylinder 174 (FIGURES 6 and 7) is linked to shaft 176 connected between two adjacent bars 172 whereby the implement 178 is lifted from the ground. The parallelogram movement insures that an implement, such as the left-hand plow shown complete with colter, is maintained parallel with the land and enables easy lifting of the plow by a backward swing of the parallelogram lift. Land wheel 180 is adjustable to suitably gage and limit the vertical position of the implement. A reverse implement 178', in this case a right-hand plow, is mounted for the reverse travel of the car. When either implement is lifted as is implement 178' its implement frame or beam 170' is within the length of the car thereby enabling the car to approach close to the trucks 32 and 34 and the implement to be lifted from the ground and the other implement lowered within a minimum space and travel of the car. The lines of pull of cable 132 as described by the diameter of drums 136 and 137 and arrangement of cable 132 are in line vertically with the center of pull of the implements, see FIGURE 7. The plows are spaced to provide clearance in lifting.

A well designed tiller can span rails at sixty foot gage without excessive weight. The wide gage runs A, B, C, and D, FIGURE 8, should be lengthwise the field for minimum track cost. The track, which is similar to industrial caster tracks in many respects, is supported on concrete footings or piers 182 by bent rods 183 welded to the underside of the rails, see FIGURE 10. The bridge travels along run A, crosses to run B on narrow gage at the top of the view, runs down B to the bottom, crosses to run C, and runs up and down D to turnaround caster guide loops 184 and hits index-stop control 186 mounted in the ground. When the bridge hits an index-stop control with the car at either extreme end of the bridge the ignition circuit of the engine is opened as will hereinafter be described with FIGURE 11, the indication being that transverse or longitudinal operation is completed. If the car is not at the end of the bridge the bridge continues back and forth between end turnaround loops 188 at the entry to the field and turnaround loops 184 at the end of the line until the car reaches the end of the bridge stopping the bridge at the next index-stop control reached. Note that the crossover curves extend into the field.

A detail of the switches circled in FIGURE 8 is shown in FIGURE 9. Two-way throw switch 190 is operated by movement of the casters, by hand or by any suitable means, and the three-way switch 191 is stationary. Throw switch 190 consists of stationary plates 192, 193, and 194. Plates 193 and 194 support curves 195 and 196 pivotally on countersunk rivets 197 at the tangent points to the narrow gage runs. The opposite ends of the curves 195 and 196 are pivotally attached by pin and slot to shifting plate 198 which rests within a recess on plate 192. Stationary switch 191 consists of a plate 200 to which tapered ends of the various converging rails are welded being arranged to properly pickup the casters. Upright flanges 202 welded to plate 200 aid in guiding the casters about the curves.

In operation the first truck caster approaching from the bottom of FIGURE 9 passes stationary switch 191 without turning off, since the following caster is connected by chain 94 to swivel therewith. When the first caster turns left on curve 195 the following caster is on the middle of switch 191, and by the action of the first caster is turned on to curve 203. The other casters on the other truck following the opposite rail follow the same pattern and the crosswise movement of the bridge is changed to lengthwise movement. The tiller entering the field from the barn 206 turns from narrow gage to wide gage and as long as it operates stays within the field. With the tiller at the turnaround loops 188 the operator can direct the casters back to the narrow gage or one of the turnaround switches can be solenoid or hand operated. If one caster is properly directed any others connected to be turned therewith will follow properly with proper design of the switches. The middle of the stationary switches should provide enough space for the casters to establish their proper direction before engaging with the angle rail again.

The turnarounds are designed with a slight drop for the caster to drop to the switch center after completing the turn as seen in FIGURE 10. Upon approaching the turnaround switch 210 all casters follow straight, since they prefer the level track to switching off and up an abrupt ledge 211. Upon following the turnaround curve 212 each caster drops to a switch center plate 214 and follows up the line 216 having completed a 180 degree turnaround of the casters. Plate 214 as well as other stationary switch plates are curved down on the ends of the switch meeting the caster wheels.

It should be observed that the bridge does not change its direction anywhere on the track layout within field D but turns on curves such as curve 220. Further, since the bridge does not turn around at the ends of runs A, B, C, and D, many implements when operated longitudinally must be reversed, changed, or used alternately for successive runs when the bridge is moved from runs A to B, B to C, C to D, D to D return, D to C, etc.

There are two hydraulic control systems, one on the car and one on the bridge. The implement lift cylinders and the lock yoke cylinder are controlled by a hydraulic system on the car. The bridge drive drum clutch and locks, the car control linkage, the implement lift control linkage, and the transverse row indexer are controlled through a hydraulic system on the bridge. There is no hydraulic connection between the car and the bridge so that hose connections therebetween are not required.

Figure 11:
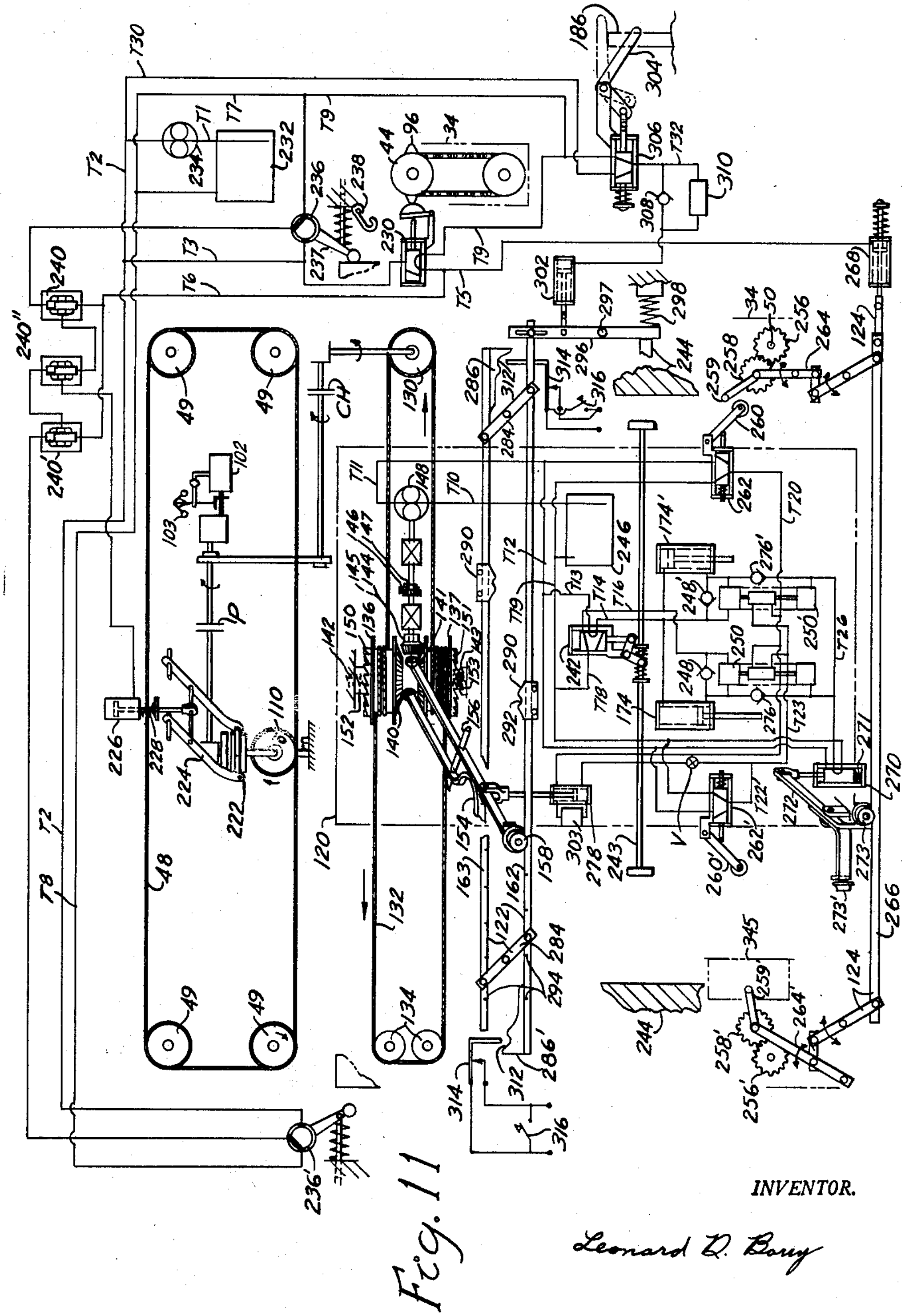
FIGURE 11 is a schematic diagram of controls for the tiller shown in the preceding views.

Referring to FIGURE 11 for details of the controls, cable drum 110 is mounted for axial movement on its shaft to be moved through yoke 224 by cylinder 226 to engage clutch 222. Spring 228 holds clutch drum 110 disengaged from clutch 222 and engages the drum with a lock 223 which holds the drum from turning and so locks the wheels of the bridge when the cylinder 226 is exhausted. To one of the casters is detachably secured two control lugs or cams 96 each on an opposite side of bracket 90 and parallel to the axis of the wheel. A three-way cam valve 230 is shown engaged with one of the two lugs 96 on the swivel bracket of a caster 44. Valve 230 is closed by a lug 96 only when the axis of the caster wheel is parallel to the length of the bridge. Therefore valve 230 is open on narrow gage, turnarounds, and crossovers. A three-way cam valve 236 is provided at the right-hand end of the bridge to be engaged by the car at that end of its run. A three-way cam valve 236' is optionally provided at the left-hand end of the bridge to be engaged by the car at that end.

The hydraulic circuits for controlling the bridge drive cylinder 226 are suction line T1 from tank 232 to inlet side of pump 234 driven from belt and pulley connection from motor 102 (see FIGURE 1), from the outlet of pump 234, lines T2 to T3 to the inlet port of three-way cam valve 236 and from T3 to T4 to the inlet port of caster lug cam valve closed only when the casters are turned at right angles to the bridge (transverse) and otherwise connecting to outlet line T5 to line T6 to the bottom ports of selective check valves 240 and 240'.

Valve 240 has a top and a bottom inlet-exhaust port, a side outlet port, and a piston or spool for sealing off either the lower or upper port according to its position. The outlet of valve 240 is connected to the bottom inlet of valve 240''. The outlet of valve 240' is connected to cylinder 226 to engage clutch 222 when pressure is received at the cylinder. Valves 236 and 236' are normally exhausting spring returned. The upper inlet port of valve 240 is connected through valve 236 in normal position to line T7 to tank 232 until the car presses the lever 237 of valve 236 in blocking its exhaust line and connecting pressure from line T3 to the top port of valve 240.

Similarly the upper inlet port of valve 240' is connected through valve 236 in normal position to line T8 to line T7 to tank 232 until the car presses the lever of valve 236' in, blocking its exhaust line and connecting pressure from line T2 to the top port of valve 240'. The side outlet of valve 240' is connected to the top port of valve 240''. If valve 236 is omitted valves 240' and 240'' would also be omitted, and the outlet of valve 240 would be connected to cylinder 226. Valve 230 has a lower exhaust port connected to line T4 to line T7 to tank. Cylinder 226 under the force of spring 228 exhausts to tank through top port of valve 240'' to center port of valve 240' from top port of valve 240', valve 236 to line T8, to line T7 to tank, since the valve spools of valves 240, 240', and 240'' drop by gravity and permits fluid, drawn from storage tank 232 by pump 234 to enter cylinder 226 enabling the bridge to operate. Hook latch 238 is provided to latch valve 236 open for continuous operation of the bridge for longitudinal cultivation. The clamping of drum 110 to the frame should hold the tiller during movement of car 120 across the bridge.

The implement lift cylinders are preferably double acting so as to be useful in operations such as to hold the plows in the ground as well as to raise them. The hydraulic circuits for controlling the implement lift cylinders on the car are from hydraulic tank 246, suction line T10 to inlet of pump 148, line T11, line T12, line T13, inlet port of four-way two-position reversing valve 242 to upper or lower outlet ports according to the position of valve 242, which in the position shown connects to the lower outlet port from which line T14 connects to the head end (lowering end) of cylinder 174, and from line T14 a T connects line T15 to the inlet end of check valve 248', the outlet of which is teed into the rod end of cylinder 174' to lift cylinder 174'. Line T16 from the upper outlet port of valve 242 runs to the head end of cylinder 174' and by T from line T16 to the inlet end of check valve 248, the outlet of which is teed into the rod end of cylinder 174. The upper outlet port of valve 242 is now connected by passage in the valve to the exhaust port. Line T18 from the exhaust port connects to line T19 to tank 246. When valve 242 is shifted its inlet is connected by passage to the upper outlet port and its lower outlet port is connected by passage to exhaust by linkage 243 which extends beyond the ends of the car and at the ends of the bridge hits stops 244 which reverse the position of valve 242. Check valves 248 and 248' prevent the lowering of the implements when valve 242 is reversed. Check valves 248 and 248' are respectively bypassed by normally closed similar double-pilot-piston two-way valves 250 and 250' one pilot cylinder of which is larger than the other whereby pressure in the large cylinder is controlling, the smaller cylinder controlling during the absence of pressure on the large cylinder. Valves 250 and 250' are lifted against gravity to open. The smaller pilot cylinder of valves 250 and 250' preferably double acting and the larger single acting. Pressure is connected from pump 148, line T11, a three-way two-position cam valve 262 normally exhausting which when pressed in connects pressure to line T20 from which lines tee off to respectively the upper and lower port of the small pilot cylinders of valves 250 and 250' and to the rod end of cylinder 278. Pressure is also connected from pump 148, line T11, line T12 to the input port of normally closed cam valve 262' similar to valve 262, which when engaged opens to line T22, line T23 which tees to the top and bottom port of respectively the small pilot cylinders of valves 250' and 250. A T in line 22 connects to a hand valve V whose outlet is connected by line T24 to the head end of cylinder 278. Valve V is left open except as noted under operations.

A spur gear 256 is keyed on a shaft 50 on truck 34. Spur gear 258 is rotatably secured on a lever 264 pivotally secured on the bridge to engage gear 256 and has an arm with depending finger 259 which engages the arm 260 of cam valve 262 on the end of car 120 toward truck 34. Lever 264 is connected to linkage 124. Linkage 124 has a linkage rail 266 which extends the length of the bridge and is actuated by spring returned cylinder 268 connected by line T5. Cylinder 268 when pressured forces down linkage rail 266 and disengages gears 256 and 258 when casters 44 are turned from the wide gage.

Dropping of linkage rail 266 opens a three-way valve 270 on car 120 by means of a valve spring 271 which actuates forked lever 272 having wheels 273 and 273' either of which rides on the linkage rail throughout the length of the bridge depending on the position of the car. Valve 270 when open to pressure insures that both lift cylinders 174 and 174' are raised by in series from pump 148, line T11, line T12, inlet port of valve 270 which is normally blocked. The lowering of linkage rail 266 opens valve 270 to pressure against its spring connecting line T12 to the outlet port line T26 teed to the bottoms of the larger pilot cylinders of valves 250 and 250' and the input port of check valves 276 and 276', whose outlets are connected to respectively the lift ends of cylinders 174 and 174'. Check valves 276 and 276' prevent fluid flow from one lift cylinder to the other, hold these cylinders raised when valve 270 opens to exhaust, and holds pressure connected by valve 242 through either valve 250 or 250' to cylinders 174 or 174' respectively. In the normal position of valve 270 line T26 is exhausting to line T12 to tank 246.

Spur gear 256' is fastened to turn with a drum 49 on truck 32 when indexing of the bridge at both ends of the car's travel is desired. Spur gear 258', similar as gear 258, is engaged with gear 256' by lever 264' connected to linkage 124 to disengage gears 256' 258 whenever linkage rail 266 is dropped. Finger 259' secured on gear 258 engages arm 260' on valve 262' located on the left end of the car. When either valve 262 or 262' is engaged by fingers 259 or 259' respectively the indication is that the bridge has indexed the proper distance for the next transverse run of car 120. If the bridge is to be indexed only when the car is at one end, a stop such as block 345 is placed to be engaged by valve 260 or 260'. The engaging of valve 260 or 260' reverses the car and implements.

Valve 262 upon opening closes valve 250' and opens valve 250 dropping implement 178, the car being at truck 34. Valve 262' upon opening closes valve 250 and opens valve 250' dropping implement 178', the car being at truck 32. Valves 262 and 262' are the only means by which valves 250 and 250' are opened, therefore only one valve 250 or 250' is opened at one time. (Valve 270, when opened, insures that both valves 250 and 250' are closed, but never opens these valves.) The valve 250 or 250' which was opened by action of the index finger 259 or 259' respectively exhausts the rod end of implement cylinder 174 or 174' respectively throughout the run of the car across the bridge; but upon linkage 243 reversing valve 242 at the end of the car's run the cylinder 174 or 174' respectively is lifted, and the opposite cylinder 174' or 174 is held up by valve 250' or 250 respectively remaining closed.

Car control linkage 122 is provided with a lower and upper linkage rail 162 and 163 respectively pivotally attached to opposite ends of lever linkage arms 284 pivotally attached at their centers to inner frame 100 providing a parallelogram movement. Valves 262 and 262' alternately reverse the cylinder 160 to shift wheel 158 from the lower to the upper car control rail and vice versa when the car engages alternate ends of the bridge. And a locator 286 is fixed on the right hand end of the linkage rail 163 and another 286' on the opposite end of rail 162. Row locators 290 are detachably clamped to the linkage rails 162 or 163 to locate longitudinal rows as desired by the farmer. The locator's cam wheel 158 to a neutral area between the linkage rails, stopping the car with wheel 158 resting in recess 292 on the locator 290. Sale markings 294 on rails 162 and 163 facilitate positioning row locators at proper intervals. Linkage rail 162 is pivotally linked to lever 296 pivoted at 297 to the bridge or truck 34, and linkage rail 162 is forced toward the right and upward by a strong spring 298 acting on lever 296, rail 163 being forced thereby toward the left and downward. Cylinder 160 is not effective in moving the linkage rails against the force of spring 298.

The normal position of the car control linkage shown is called INTERMEDIATE-RUN-POSITION. When wheel 158 is carried far enough off rail 162 or 163 as by row locators or end stops the position is called STOP-POSITION or NEUTRAL; since wheel 158 is forced to the middle area if lock clutch 152 or 153 was engaged it is thereby released through action of yoke 154. When a single acting cylinder 302 which is linked to lever 296 is pressured, lever 296 is forced opposite to spring 298 and the control rails are spread wide apart in this position called START-POSITION, whereby the car is started from its position when wheel 158 was in NEUTRAL. A two-way pressure relief valve 303 connected across the ends of cylinder 160 is set to relieve the cylinder of pressures above the line pressure, whereby the cylinder can follow the vertical movement of wheel 158.

An index-stop lever 304 actuated by index-stop control 186 operates a three-way valve 306 spring returned to exhaust. When stop 186 moves lever 304 to the position shown in dotted lines fluid is connected from pump 234, line T30, inlet of valve 306 open to outlet port, line T32 teeing to inlet of check valve 308 and bleed valve 310, whose outlets are connected to the head end of cylinder 302. After lever 304 passes stop 186 cylinder 302 is returned slowly to normal position by exhausting through bleed valve 310 under force of spring 298, after car 120 is well on its way to the next locator or end stop 286 or 286'. When wheel 158 is on an end stop and a stop 186 actuates lever 304 wheel 158 rides into a recess 312, and thereafter when cylinder 302 exhausts after stop 186 is passed wheel 158 is forced against limit switch 314 which opens the ignition of engine 102.

It is preferred that car 120 should be stopped when the bridge is moving except during indexing of the car in longitudinal operation. Accordingly the end stops run wheel 158 into NEUTRAL at the ends of the bridge until the lock yoke is shifted by movement of finger 259 or 259', or row locators 290 hold wheel 158 in NEUTRAL until an index-stop is reached.

Figure 18:
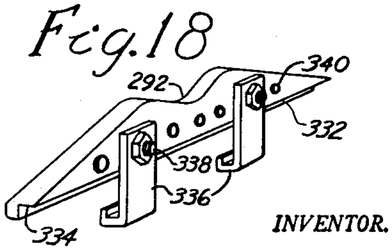
FIGURE 18 is a perspective view of one of the row locators spaced along the bridge to stop the car.

The row locator shown in detail in FIGURE 18 has a block 332 with an incline edge over which wheel 158 rolls, the depression 292 between two peaks on this edge in which wheel 156 comes to rest when it rides up therein, and a groove 334 on the opposite edge which fits the linkage rails whereby grooved hook brackets 336 secured by bolts 338 through holes 340 in block 332 clamp the block to either rail 162 or 163. Brackets 336 can be bolted through different holes whereby linkage pieces 284 are avoided enabling the locator to be placed anywhere along these rails between the end stops.

The procedure for automatic transverse operation is as follows:

Arrange the car and implements for transverse operation. Set stop 345 at the end of the bridge if the bridge is not to index when the car reaches that end. Start the engine with the transmission in neutral and the power take-off disengaged. Pump 234 should start. Put wheel 158 in neutral as by placing a row locator under and another above the wheel. Check that valve V is open and valve 236 unlatched. Engage the power take-off through hand clutch CH. Car rope 132 starts car pump 148. The implements should lift with the tiller on narrow gage, since caster valve 230 is then open, connecting pressure to cylinder 268, which drops rail 266 to permit spring 271 to lift valve 270, which then connects pressure to the rod ends of cylinders 174 and 174'. Remove all row locators; the car will run to an end on the bridge at which the bridge indexes and the car will then stop, since wheel 158 runs onto an end stop 286 or 286', throwing lever 154 to neutral, disengaging respectively clutch 151 or 152, stopping the car until the reverse valve 262 or 262' respectively is pressed in reversing cylinder 278, which throws lever 154 to the other control rail for the return run of the car. Disengage clutch P; shift transmission 144 for the proper bridge speed; and engage clutch P. The bridge will travel lengthwise down track to field F. When the casters swivel crosswise into the field and reach an angle approximately 90 degrees to the length of the bridge caster valve 230 closes, exhausting cylinder 268, engaging the indexing control gears 258 and 258'. Consider the car to be at the right hand end of the bridge. Finger 259 opens valve 262 which shifts cylinder 160 lowering wheel 158 to rail 162 and reverses valves 250 and 250' lowering the implement 178. As cable drum 136 is stopped from revolving by engagement of clutch face 150 with 152 the cable starts to pull the car toward the opposite end of the bridge. Implement 178 is dropped at the desired speed selected according to the orifice size used in valves 250. As the car leaves the end of the bridge valve 236 is disengaged and exhausts cylinder 226 stopping the bridge. When the car reaches the left hand end of the bridge the lift actuator 243 is shifted lifting the implement 178, and linkage wheel 158 rides into NEUTRAL on end locator 286' stopping the car as it opens valve 236' starting the bridge in motion. Index finger 259' opens the reverse-release pilot valve 262' momentarily thereby reversing valves 250, and 250' and cylinder 160, starting the car toward the right end of the bridge and lowering implement 178' for the second run of tillage; whereafter the process is continuously repeated until the casters enter the crossover curve opening caster position valve 230. The opening of valve 230 connects pressure to cylinder 268 to lower linkage 266, disengaging the index gears, preventing the lowering of an implement and the movement of the car during the crossover. The foregoing process is repeated as when the bridge first turned into the field. When the turnaround 184 is reached with transverse operation index valve 306 is opened by the end-of-the-line index-stop 186 and held open while wheel 158 rides into recess 312 in an end locator. After the field located index-stop is passed cylinder 302 exhausts and wheel 158 trips limit switch 314 opening the engine ignition. Operation is resumed by manually removing wheel 158 from recess 312 or by bypassing the open limit switch with hand switch 316.

The procedure for manual longitudinal operation is similar to transverse operation except as follows:

Arrange the car and implements for longitudinal operation. Move the car to the right hand end of the bridge. Secure row locators on rail 162. Hook valve 236 open. Close valve V. Proceed as with transverse operation. After pressure comes on, the implement lifts as when setting up for transverse operation. Press in valve 262. Open valve V until wheel 158' is forced against rail 162; then close valve V. Wheel 273' engages rail 266. Position linkage 243 so that the desired implement is ready to be dropped when its check valve bypass valve is opened. Let the car ride to the first row locator. Start the bridge in motion. When the bridge turns into the field, with the car stopped at a row locator, lower the implement desired by pressing in valve 262 to lower implement 178 or valve 262' for implement 178'. At the end of run A the implement is automatically lifted as at the start. The crossover switches are located far enough ahead of the crossover tracks so that the implement will be lifted before the crossover track is reached. Linkage 243 is manually reversed, and then by pressing in valve 262' or 262 the desired implement is manually lowered. On each run the implements are manually lowered when desired and automatically lifted and held through the crossover. As the bridge continues back and forth the car is indexed at each index-stop until the bridge is automatically stopped when the car reaches the end of the bridge and subsequently contacts an index-stop. With the index-stop properly located along the curve the implements are raised during the indexing of the car.

Figure 17:
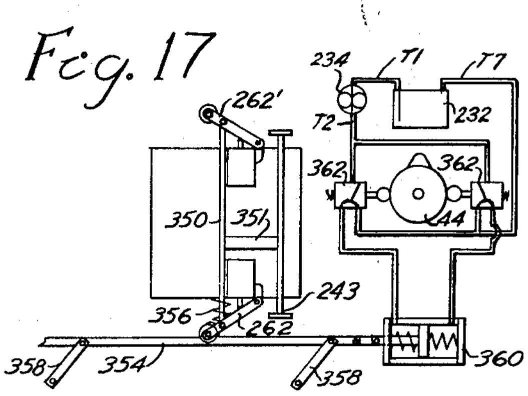
FIGURE 17 is a schematic control diagram of the controls for lowering the implements alternately for longitudinal operation.

Automatic lowering of the implements during longitudinal operation is provided by adding to the tiller the linkage and controls shown in FIGURE 17. Valves 262 and 262' are linked together by rod 350. Rod 350 is secured to linkage 243 in the proper position by cross member 351. The cam wheel of valve 262 is held to rail 354 by spring 356. Rail 354 extends the length of the bridge, is supported on linkage arms 358, and is linked to the piston of a spring-centered double-acting cylinder 360. Cylinder 360 is controlled by cam valves 362 and 362' both similar to valve 230 and placed on opposite sides of a caster 44 to be opened by a detachable lug placed on the caster so that the desired valve is opened when the casters are on one run and is alternately opened during every other run the other valve being opened during intervening runs of the bridge. Hydraulic connections are made from the outlet of pumps 234 line T2 teeing to the inlet of each valve 362 and 362' which are shown in their normally closed inlet position. The outlet ports of valves 362 and 362' are respectively connected to the left and right hand ends of cylinder 360, and the exhaust ports are teed into line T7 to tank 232. The engaging of the lug with valve 362 connects pressure from pump 148 to the right hand end of cylinder 360 forcing linkage rail 354 toward the car, shifting linkages 350, 351, and 243, opening valve 262, closing valve 262', and reversing valve 242. Then valve 262 connects pressure to open pilot valve 250 and close valve 250', exhausting through valve 262', but does not operate cylinder 160, since valve V is closed. Cylinder 174 then exhausts through valve 250, dropping implement 178. Valve 242 then connects pressure and exhaust lines to lift cylinder 174 and lower cylinder 174' whose lifting port is open through valve 250 dropping implement 178'.

Complete automatic longitudinal and transverse operation is provided with the tiller disclosed in the foregoing discription.

Figure 12:
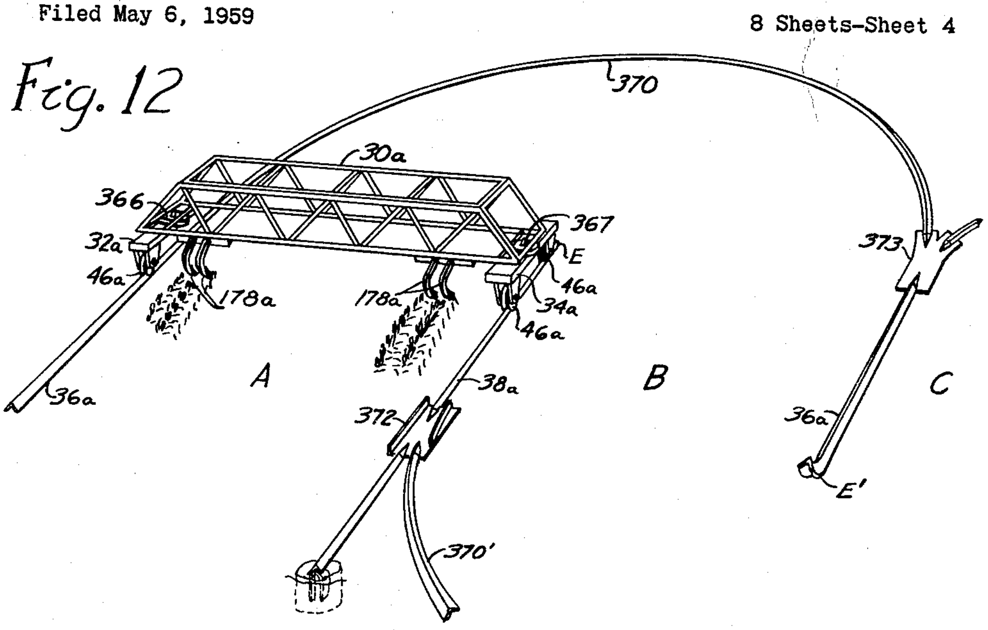
FIGURES 12 and 13 are perspective views of two variations of the tiller and track layout.
Figure 13:
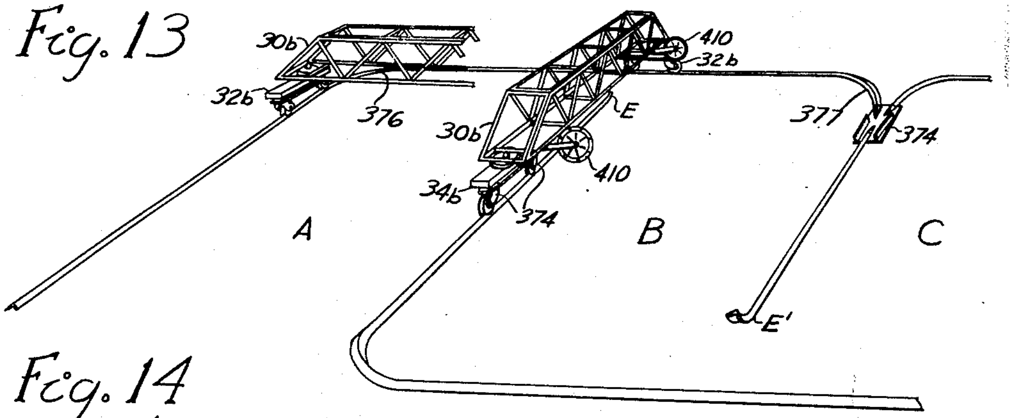
Figure 14:
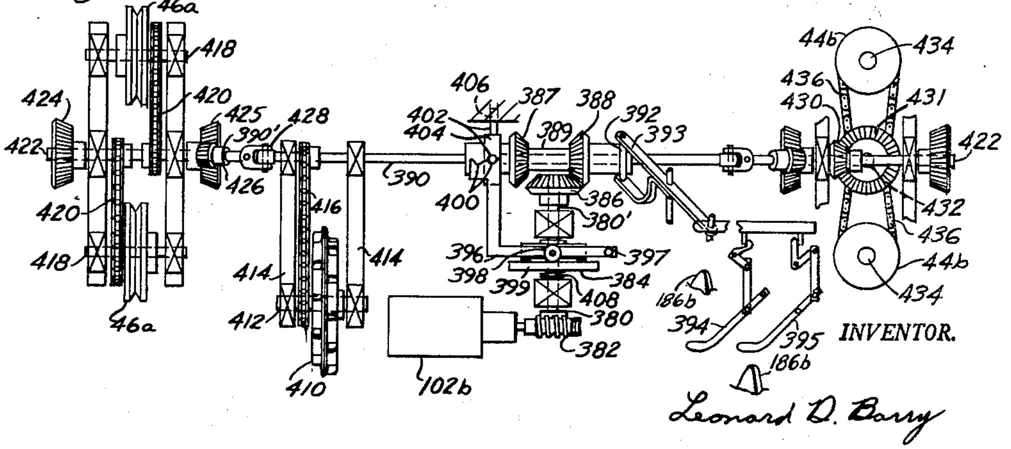
FIGURE 14 is a diagrammatic view of the drive for the tillers shown in FIGURES 12 and 13.
Figure 31:
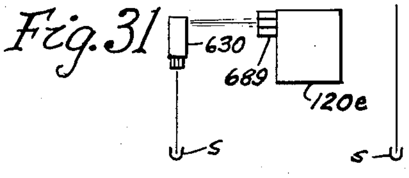
FIGURE 31 is a schematic plan view of a field with a tiller car and control truck with light beams shown for guiding the same.

FIGURES 12, 13, and 14 illustrate two somewhat different forms of track guided farming devices. Referring to FIGURE 12, bridge **30*a* is pivoted on trucks 32*a* and 34*a* at 366 and 367 respectively. Two grooved wheels 46*a* are engaged with each rail and rotatably secured to the frame of each truck. The wheels of truck 34*a* are stopped when the leading wheel of this truck hits track end-stop E; the other truck 32*a* continues around a semicircle 370; and truck 32*a*, bridge 30*a*, and implements 178*a* are turned around 180 degrees on the pivot of truck 34*a* then centered on the center of radius of curve 370. When the tiller reaches the bottom of run B, truck 32*a* hits end-stop E'; and truck 34*a* rounds curve 370'. Simple two-way switches 372 and 373 similar in principle to three-way stationary switches 191** are provided. Turns between successive runs are made similarly by alternate trucks. No implement lift is needed for longitudinal or transverse operation of many implements. This tiller and the one shown in FIGURE 13 can have many of the features shown for the preceding tiller which are not repeated here.

FIGURE 13 shows the tiller of FIGURE 12 slightly modified in that the wheels are mounted in swivel caster frames 374. The area required to turn is reduced with the truck and bridge arrangement shown in FIGURE 13, since curves 376 and 377 are small. The truck **34*b* is forced back as truck 32*b* makes turn 376 and truck 34*b* returns to the end of the rail E as the bridge 30*b* straightens across run B as truck 32*b* completes turn 377**. The turns between successive runs are made similarly by alternate trucks. The implements are lifted while the bridge is manually turned on the crossover.

A simple drive is shown in FIGURE 14 suitable for either the tiller shown in FIGURE 12 or 13. Engine **102*b* drives shaft 380 through reducer 382. Shaft 380 through clutch 384 engages shaft 380' on the end of which is secured beveled gear 386. Beveled gears 387 and 388 secured on sleeve 389 which is splined on shaft 390 to slide beveled gear 387 and 388 to engage beveled gear 386. Sleeve 389 is provided with a slip ring 392 and yoke 393 which is linked to end-of-the line reverse levers 394 and 395 which engage actuators located to engage levers 394 and 395 alternately at opposite ends of the line to shift gears 387 and 388. While the gears are shifted clutch 384 is cammed open by lever 396, pivoted at 397, having a roller 398 thereon arranged to roll along flange 399 on clutch 384 as the clutch turns and a cam 400 with two recesses which engage one of two dowels 402 secured radially to slip collar 404 about sleeve 389. The other dowel is inserted in a slot 406 in the bridge whereby the slip collar 404 is prevented from revolving with sleeve 389 but moves with the sleeve axially as the yoke 393 is shifted, lever 396 being cammed by the shifting of pin 402 on cam 400 to open clutch 384 against its spring 408** when the yoke is shifted. Such a reverse drive is approximately shown in my Patent 2,768,757.

Bridges **30*a* and 30*b* are each simply propelled by two land wheels 410 supported near the ends of the bridge each on a shaft 412 pivotally secured to arms 414 pivoted on shaft 390 wherefrom the wheels 410 are driven by chain and sprocket drive 416**.

Bridges **30*a* and 30*b* are also optionally propelled by rail drives. A nonswivel-grooved-wheel pivoted-truck drive is illustrated on the left hand truck of FIGURE 14. Grooved wheels 46*a* each on a shaft 418 are driven by chain and sprocket drive 420 from parellel shaft 422 having its axis through and at right angles to the axis of the truck swivel. On shaft 422 are secured two similar beveled gears 424 and 425 with the vertex of their pitch cones on the axis of the truck swivel. Beveled gear 426 secured on shaft 390' coupled to shaft 390 by universal joint 428 meshes either gear 424 or 425 when the truck is crossways the bridge but disengages when the truck is stopped while the bridge pivots on this truck. The opposite truck drives the bridge around the semicircular curve 370 or 270', but this drive disengages on curves 376 and 377. Gear 426 re-engages the opposite gear 425 or 424** when the bridge completes its turn, and the truck about which the bridge pivoted is driven away from stop E or E' in the reverse direction.

This swivel-truck drive is adaptable to swivel casters as shown on the right hand truck of FIGURE 14. Drive 420 is replaced with beveled gear 430 secured on shaft 422 and engaged with beveled gear 431 on shaft 432 on the axis of the truck pivot. Shafts 434 each on the axis of a caster swivel are driven by chain and sprocket drive 436 from shaft 432. Casters **44*b* are similarly driven from shafts 434 as casters 44 are from shafts 50**.

The three drives shown in FIGURE 14 can be combined on one tiller as illustrated. Where transverse tilling is required either rail drive alone is preferred to the land traction wheels because of the land taken for these wheels to run on.

Figure 15:
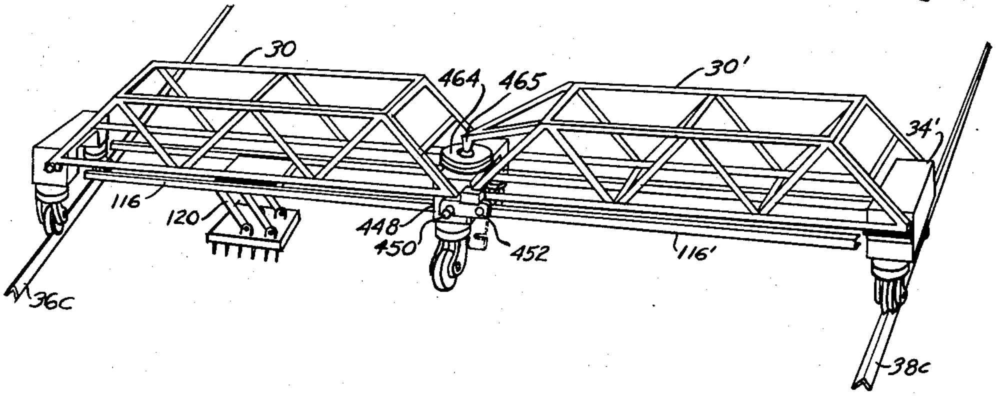
FIGURE 15 is a perspective view of a two-span bridge tiller.
Figure 16:
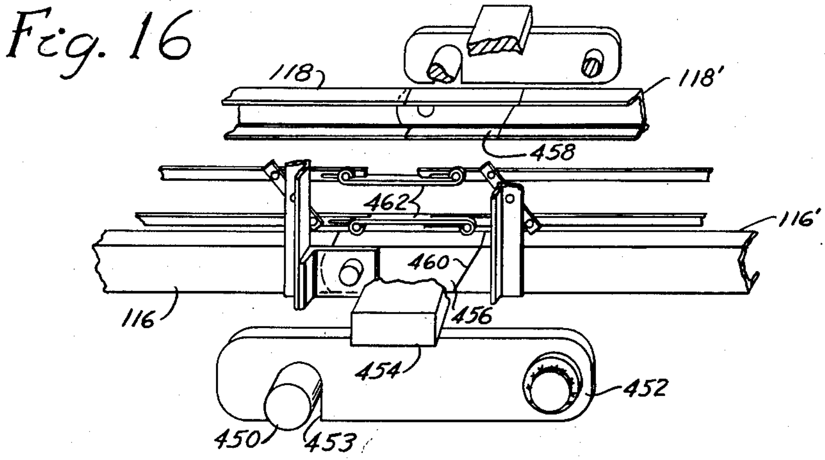
FIGURE 16 is a perspective view of the hinge details between the bridge sections shown in FIGURE 15.

FIGURES 15 and 16 illustrate a two-span bridge tiller whereby rails 36c and 38c are spaced at a considerably greater distance than is practical with a single span. Truck 34 is replaced by truck 448 which allows car 120 to pass from span to span. Provision made for hinging bridge span 30 to span 30′ for vertical movement and the cables and controls are extended to the end of the second span 30′ whose one truck 34′ is similar to truck 34. Additional spans 30′ each with a truck 448 can be added for wider spacing of the rails. The spans are hinged together on aligned pivots 450 by bars 452 one pivotally attached to each side of span 30′ and arranged to swing out from their detached position shown in dotted lines and engage slot 453 therein over pivot 450 which is preferably mounted on truck 448. Stops 454 on span 30′ each hold a bar 452 against the upward force of pivot 450. Hinged channel sections 456 and 458 are pivotally attached to and in alignment with channels 116 and 118 on the axis of pivots 450 which axis also passes through the center of these channels. Channels 456 and 458 are cut on an angle at 460 to rest against channels 116′ and 118′ of section 30′ also cut on this angle. The linkage rails on adjacent bridge spans are connected by flexible links 462 each having a pin secured at each end through a slot in the adjacent end of the rail. The end stops would be only at the ends of the bridge so that the levers can travel on linkage rails from span to span.. A centrally located pivot plate 464 on truck 448 and a pin or socket 465 on span 30′ are engaged when the bridge hinge is unhooked, providing a convenient means to move the string of bridges around curves.

Figure 19:
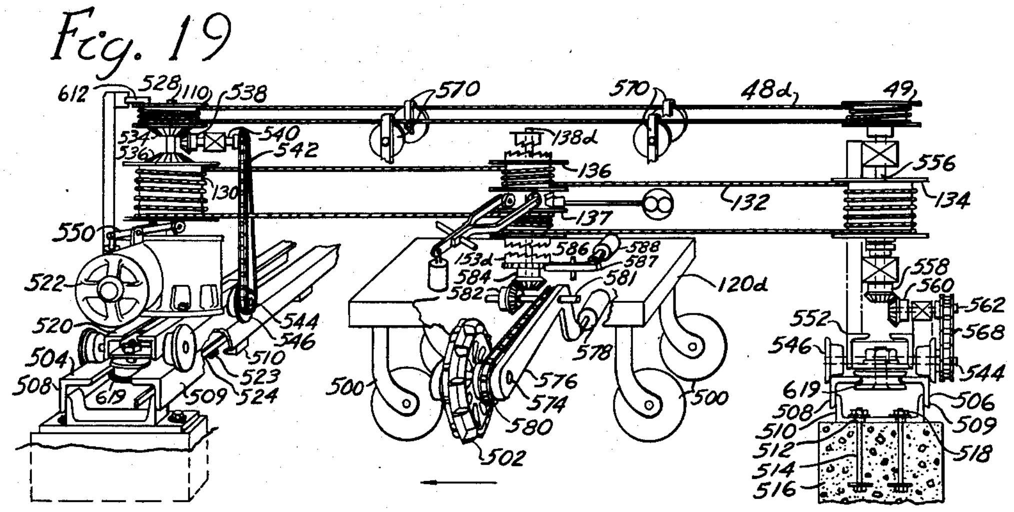
FIGURE 19 is a diagrammatic perspective view of a cable-guided tiller.
Figures 20, 21:
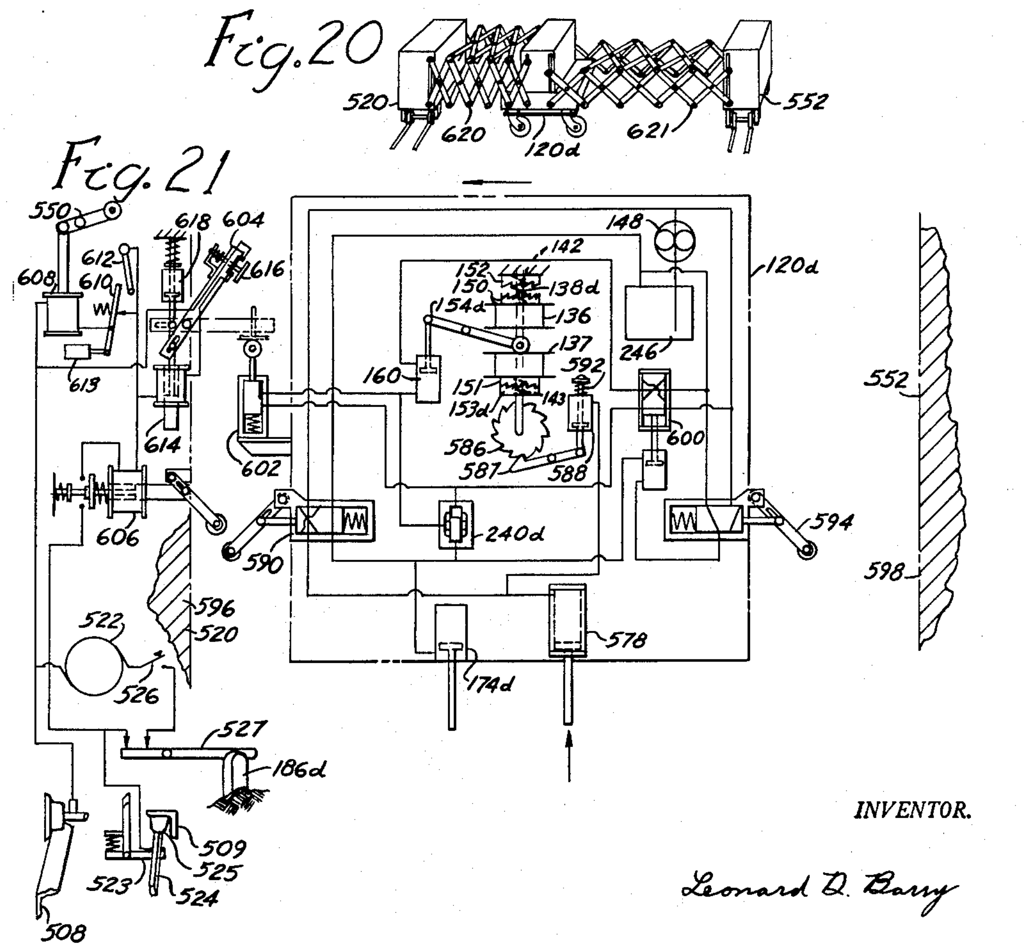
FIGURE 20 is a perspective view of a telescoping-frame-guided tiller.
FIGURE 21 is a schematic diagram of controls for the tillers shown in FIGURES 19 and 20.

FIGURES 19 and 21 show a variation of the tiller wherein the car 120d runs on swivel land casters 500 and is transversely propelled similarly as car 120 by continuous cable 132 and longitudinally propelled by its own traction wheel 502.

Parallel tracks 504 and 506 are laid out along opposite sides of the field. Each track comprises two angle rails 508 and 509 spaced apart at intervals by channel members 510 which are provided with holes 512 that fit over bolts 514 imbedded in concrete pier 516. The track is held in place by nuts 518 whereby it can be removed and relocated.

Truck 520 on track 504 is provided with a D.C. electric gear-motor 522 taking power through arm 523 from conductor bar 524 mounted on insulators 525 on the under side of rail 509 and using rails 508 and 509 as return conductors. The gear motor is in series with hand switch 526 and lever switch 527 opened by stop 186d located projecting from the ground at the end of the run. The gear motor drives shaft 528 vertically mounted to the truck. Cable drum 130 is splined for axial movement on shaft 528. Cable drum 110 is free to rotate but axially held on shaft 528. To the facing flanges of drums 110 and 130 are secured beveled gears 534 and 536 respectively. Beveled gear 534 is in mesh with beveled gear 538 on shaft 540 which drives through chain and sprocket drive 542 shaft 544 on which two flanged wheels 546 are fixed. Shaft 544 is rotatably secured to the frame of truck 520. Yoke 550 controls the vertical movement of drum 130 engaging the beveled gear 536 thereon with beveled gear 538 to drive drum 110.

A second truck 552 is propelled from the power truck 520 by an endless cable 48d around drum 110 on truck 520 and about drum 49 on truck 552. Drum 49 secured on vertical shaft 556 at the top drives beveled gear 558 secured on the bottom of shaft 556 to mesh beveled gear 560 secured on shaft 562 and wheels 546 secured on shaft 544 through chain and sprocket drive 568 similarly as on the power truck 520. Drum 134 is rotatably secured on shaft 556. About drums 130 and 134 between the trucks is run the endless car power cable 132 which drives drums 136 and 137 similarly as on the car 120. Cable guide pulleys 570 are provided on car 120d for supporting cable 48d.

Car traction wheel 502 is mounted on shaft 574 bearing in two arms 576 which are pivoted to the frame of car 120d. Arms 576 are lifted by cylinder 578 to disengage wheel 502 from the ground during transverse movement of car 120d. Wheel 502 is driven through chain and sprocket drive 580 from shaft 581 on the pivot of arms 576. Beveled gear 582 secured on shaft 581 is engaged with beveled gear 584 which has a clutch back 153d and is rotatable on shaft 138d whereon also is mounted the cable drums 136 and 137 similarly as on car 120.

The control circuits for truck 520 and car 120d provide for transverse operation of car 120d between trucks 520 and 552 and the indexing of car 120d each time it reaches truck 520.

Beveled gear 584 has a ratchet wheel surface 586 around the hub thereof. Ratchet 587 is secured to the piston of cylinder 588 to engage with ratchet wheel 586. Spring 592 releases ratchet 587. Double acting cylinder 160 actuates yoke 154d whereby either clutch 150 on drum 136 is engaged with clutch face 152 on the car's frame or clutch 151 on drum 137 engages clutch 153d on beveled gear 584. Spring 142 separates clutch faces 150 and 152. and spring 143 separates clutch faces 151 and 153d as on car 120. The four-way cam valve 590 is located on the end of the car facing truck 520, and a three-way cam valve 262 is located on the end facing truck 552. Fluid connection is made from tank 246 by line T1 to pump 148 and from pump 148 by line T12 to inlet of four-way valve 590, passage in valve 590 opened in normal position to line T40, teeing to the head ends of cylinders 578 and 588. The rod end of cylinder 174d and of the cylinder of valve 600 are teed together to line T44 to an outlet port of valve 590 normally connected to exhaust port to line T19 to tank 246. Valve 590 is reversed upon engagement with truck 520 connecting pressure line T12 to line T44 to lift cylinder 174d and reverse valve 600 and connecting line T40 to exhaust line T19 to exhaust cylinders 578 and 588 respectively lowering wheel 502 and releasing ratchet 587 to free drum 137. Valve 262 in normally exhausting position connects the head end of the cylinder of valve 600 to tank 246. Valve 262, normally exhausting, is opened to pressure by engagement with truck 552. Valves 590 and 262 when engaged with their trucks therefore reversely connect fluid from pump 148 to opposite sides of the piston or spool of four-way pilot valve 600. Valve 600 which remains in position when valves 590 and 262 exhaust connects fluid from pump 148 to either side of cylinders 160 according to which valve 590 or 594 had engaged its truck last. Fluid connection is made from pump 148, line T11, line T42, inlet of valve 600 shown connecting to line T43 to cam valve 602 normally closed and with tee to the top port of valve 240d. When valve 602 is opened it connects line T43 to T45 to the head end of cylinder 160 with T to the side port of valve 240d. The rod end of cylinder 160 is connected through valve 600 to line T19 to tank 246. Valve 602 on car 120d engages arm 604 on truck 520 to stop the indexing of car 120d. Valve 602 is connected in parallel with the normally exhausting port of valve 590 through selective check valve 240d the output of which is connected to cylinder 160 so as to engage clutch 153d under pressure.

Upon car 120d reaching truck 520 both truck 520 and car 120d index together. Truck 520 moving slightly faster than car 120d reaches its proper location and extends arm 604, which car 120d soon bumps initiating the return trip of the car.

A stick limit switch 606 on truck 520 is closed by movement of car 120d thereagainst to start the index movement of the truck. A circuit is completed by switch 606 including in series from power line 524, shoe 523, line L1, contacts and coil of stick switch 606 in series, line L2, normally closed switch 610, solenoid 608, line L3, to ground. Solenoid 608 lifts and operates lever 550 to engage beveled gears 536 and 538 to index both trucks together. Contact arm 612 secured to drum 110 opens switch 610 as the truck indexes, but the contact arm completes the circuit across switch 610 until the truck has indexed the desired amount at which time the contact arm leaves switch 610, which is slowly returned by spring under the delay of dashpot 613 to its normally closed position. While switch 610 is open (returning) switch 606 opens by the movement of the car 120*d* away from the truck 520.

Truck 520 has an arm 604 pivotally secured thereon to swing out toward car 120*d* after the truck indexes the desired amount. Arm 604 is operated by solenoid 614 by a circuit completed from across rails 524 and 508 and including in series shoe 523, line L1, front contacts and coil of stick switch 606 in series, line L2, solenoid 614, normally open limit switch 616 mounted on arm 604 to be closed by car 120, line L3 to rail 508. By this arrangement arm 604 is extended only after car 120*d* hits stick switch 606 until it hits arm 604. The slow movement of the arm provided by dashpot 618 and the fact that the trucks index faster than the car insures that the car will not bump the arm before the index is complete.

Car 120*d* is indexed when valve 590 engages with truck 520, opening valve 590, which exhausts cylinders 578 and 580, reverses valve 600, lifts the spool of valve 240*d* connecting pressure to the head end of cylinder 160, and connecting pressure to the rod end of cylinder 174*d* lifting the implement. When cylinder 578 exhausts, wheel 502 drops. When cylinder 580 exhausts, spring 592 lifts latch 587, which stops the movement of the car toward truck 520 by releasing drum 137, which when released drives wheel 584 through beveled gears 582 and 534 to propel the car parallel to the truck. Valve 600 is now connecting pressure on the rod end of cylinder 160 whose exhaust is blocked by cam valve 602. Valve 602 is positioned to engage arm 604 to open. When the trucks have indexed, stopped and arm 604 is extended, the car engages arm 604 opening valve 602 which exhausts the head end of cylinder 106 reversing lever 154, engaging clutch 150 to the frame to lock drum 136 to pull the car away toward the other truck. Drum 137 is lifted by spring 143 disengaging clutch 151, stopping wheel 502. Valve 490 reverses when disengaged from the truck, connecting pressure to cylinder 578 to lift wheel 502 from the ground, and to cylinder 588 to lock ratchet wheel 586. Valve 590 exhausts cylinder 174*d* to lower the implement, drops the spool of valve 240 to provide an exhaust bypass for the head end of cylinder 160 around valve 602 which closes when the car and truck separate. Cylinder 160 does not shift lever 154*d* until valve 602 is opened upon hitting arm 604 exhausting the bottoms of cylinder 160 whereupon pressure through valve 600 acts to shift lever 154*d* for the return run of car 120*d*.

Trucks 520 and 552 are provided with double grooved wheels 619 each rotatably secured to the truck frame in a horizontal plane between and engaging rails 508 and 509 whereby the trucks are held against the pull of the cables.

Referring to FIGURE 20, telescoping bridge frames 620 and 621 are added, connecting truck 520 to car 120*d* and car 120*d* to truck 552, whereby the car is guided in its movement between trucks with greater precision than obtained with the cable drive alone and whereby the trucks are maintained vertical even with wheels 619 removed.

FIGURES 22–29 show another variation of the automatic guided farming device and further features applicable to the described forms. A feature of these figures includes the application of beams of light for guiding and controlling the tiller.

Figures 22, 23:
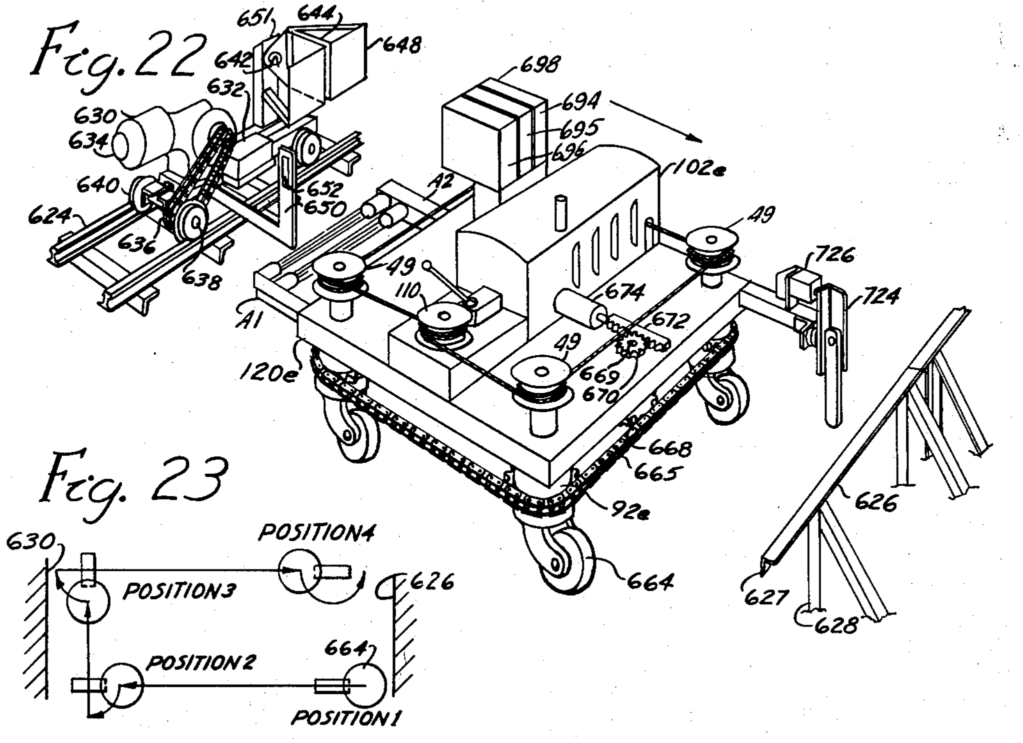
FIGURE 22 is a diagrammatic perspective view of a light-beam-guided tiller.
FIGURE 23 is a sequence diagram illustrating the cycle of caster movements.

According to the subvariation shown in FIGURES 22–24 a portable track 624 is laid along one boundary or side of the area to be tilled. A bump rail 626 is secured along the opposite boundary. The bump rail preferably consists of portable lengths of angle member 627 of structural steel horizontally supported on legs 628 spaced at intervals therealong to drive into the ground. A fence can also serve as a bump rail.

A vehicle 630, herein called a truck, having wheels 640 to travel on track 624, is propelled by gear motor 634 through chain and sprocket drive 636 about axle 638 to which two track wheels 640 are secured. The truck carries a light or other source of radiant energy 642 and shielding 644 and focusing means 646 for directing the energy into a narrow beam or sheet to guide car 120*e* between truck 630 and stop rail 626. A light baffling 648 around the light source blocks stray rays in line with the light source. The source 642 and shielding 644 are preferably supported on an upright member 651 which can swivel and lock at any desired angle with respect to track 624 to direct the car 120*e* along the desired angle of working.

Lamps 684 and 685 control the indexing of both truck 630 and car 120*e*. Lamps 684 and 685 are supported on arm 686 extending from the end of car 120*e* which faces truck 630 and directs light parallel this end of the car. Truck 630 has a baffle arm 650 extending toward car 120*e* with a photoelectric cell 652 thereon to intercept the light beams from lamps 684 and 685. The photoelectric cell is connected across the coil of a sensitive relay 656 which has front contacts closed when the light of lamp 684 or 685 shines on cell 652. Relay 656 closes a circuit from the positive of battery 632, switch 660 (closed), switch 610*e*, front contacts of relay 656, pullin coil of stick relay 658 to the negative of battery 632. Stick relay 658 is thereby energized to close the circuit of motor 634 from the positive of battery 632, switch 660, switch 610*e*, hold coil and front contacts of stick relay 658, switch 662, motor 634 to the negative of battery 632. Truck 630 then runs along the track until this circuit is opened either manually by switch 660 or after a predetermined index at which time switch 610*e* is opened dropping relay 658. Switch 610*e* is delayed from closing by dashpot 613*e* until the implement car leaves the truck, removing lamps 684 and 685 from cell 652, dropping relay 656 leaving the motor circuit open after switch 610*e* recloses.

Index limit switch 610*e* is opened by a lever arm 612*e*. Arm 612*e* can be operated by a turning arm 259 as in FIGURE 11 or, where it is desired to accurately retrace rows, arm 612*e* is actuated by index-stops 186*e*′. Index-stops 186*e*′ are steel or wood posts placed in the ground at the desired intervals to stop the index at the desired spot. Arm 612*e*, spring biased away from switch 610*e*, first engages the bottom of 186*e* as viewed in FIGURE 24, rotating 612*e* clockwise against its spring and engaging switch 610*e* rotating it counterclockwise. Lever 612*e* has contacts which hold the motor drive circuit in parallel with switch 610*e* as lever 612*e* opens switch 610*e* so that the truck continues to operate until lever 612*e* passes stop 186*e*′ to be restored by its spring to the position shown in FIGURE 24. Switch 610*e* is delayed from closing by its dashpot 613*e* which holds open the motor circuit stopping the truck which causes the car to move away as will be described, disengaging lamps 684 and 685 from shining on cell 652, dropping relay 658, preventing the reclosing of the motor circuit until the car returns. This control feature is also applicable in the preceding embodiments herein described.

The novel implement car 120*e* is provided with a four wheel caster drive complete with engine 102*e*. Each caster 664 horizontally swivels and has a sprocket tooth rack 92*e* around the swivel bracket thereof. The casters are aligned and connected by chain 665 around the four equal caster sprockets 92*e* to maintain alignment. Sprocket 668 engaging chain 665 steers the four casters together. Sprocket 668 and a spur gear 670 are secured on a vertical shaft 669 to turn together on the frame of the truck. A gear rack 672 is engaged with spur gear 670. The rack is arranged for lengthwise movement in groove 676 on the frame of car 120*e*. The rack is secured on the rod of cylinder 674 secured to the frame of the tiller for actuating the rod. The car will not be turned around by the drive, since the caster wheels all turn the same amount at the same time and always rotate in the same direction in parallel planes. During operation the caster wheels are continuously rotated without reversal of rotation by a drive such as the cable drive described for the bridge tiller FIGURES 1–4 and 11, similar parts having the same reference numbers. The car is controlled to index and steer by pivoting the casters. The car has provision to index longitudinally only when it approaches truck 630. Approach of car 120*e* to truck 630 is detected by interruption of light beams with baffle 650. Photoelectric tubes 680 and 681 each having a tubular light shield 682 are placed opposite lamps 684 and 685 also having shields 682. The shielded lamps are horizontally spaced on arm A1, and the shielded tubes are arranged on arm A2 so that each light shines parallel only on one tube. The arms extend from the end of the car facing the truck to straddle baffle 650 on the truck to break the light beam from the outermost lamp 684 from reaching its outer tube 680, and then as the car approaches the truck both lights reach their tube, but as the car approaches still closer only the inner light 685 is shielded from reaching tube 681. Lamps 684 and 685 are connected across battery 688 in a circuit from the positive of battery 688, hand switch 689, line L20, lamps 685 and 684, line L22, all in series to the negative of battery 688. Tubes 680 and 681 close circuits from the positive of battery 688, switch 689 to line L24 in series and from line L24 in parallel tubes 680 and 681 each in series with the coil of relays 686 and 687 to the negative of battery 688. Relay 686 closes a circuit from the positive of battery 686, switch 689, line L20, line L28, back contacts of relay 686, coil of solenoid valve 690, line L30 all in series to the negative of battery 688. Relay 687 closes a circuit from line L28, back contacts of relay 687, coil of solenoid valve 691, all in series to line L30. Spring returned three-way valves 690 and 691 control steering for indexing the car.

Connection is made from pump 148, line T50, line T51, orifice 692, normally closed inlet port of valve 690 which when opened connects to line T52 teeing to the upper pilot port of valve 716 and to the upper inlet port of valve 717, which opens to side port, line T53 to the right hand end of cylinder 674. In normal position shown valve 690 connects line T52 to line T56, to T58, to tank 246. Connection is also made from line T51 by T ahead of orifice 692 to line T60 to the normally closed inlet port of valve 691 which when opened (as shown) connects to line T61 teeing to the upper pilot port of check valve 717 and to the upper inlet port of check valve 716, which opens to side port, line T62 to the left hand end of cylinder 674. Switch 689 is closed to turn on lights 684 and 685 during operation. These lights energize cells 680 and 681 respectively to lift relays 686 and 687, deenergizing the solenoids of valves 690 and 691, which exhaust fluid from the tops of valves 716 and 717 respectively, enabling these valves to be controlled by their lower pilot cylinders, i.e. by the steering control of cells 694–696.

Then when cell 694 for example receives light to open valve 704, pressure is connected from pump 148 through valve 704 to the pilot cylinder of valve 708 forcing the spool of valve 708 down, which connects pressure from line T50 to line T60 to the lower inlet of valve 716 and to the lower pilot of valve 717, lifting valves 716 and 717. Valve 716 then connects pressure from line T60 to the left hand end of cylinder 674 which moves the piston out exhausting the rod end through the lower inlet of valve 717 opened by the lower pilot piston therein and through valve 709 to the tank. Thus when light 684 is shielded from tube 680 by baffle 650 relay 686 drops, energizing valve 690, connecting fluid through orifice 692 to the upper pilot of valve 716 and upper inlet of valve 717 whereby the casters are slowly turned in one direction, and when light 685 is shielded from tube 681 by baffle 650 the casters are turned in the opposite direction relatively quickly.

Figure 30:
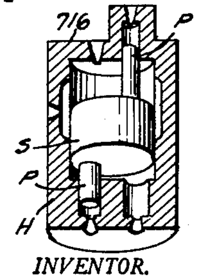
FIGURE 30 is a perspective sectional view of a special check valve in the steering control of FIGURE 24.

Check valves 716 and 717 serve the same function as valves 240 but are for a double acting cylinder. Valves 716 and 717 are similar. Valve 716 is shown in FIGURE 30 having a spool S which has a pilot extension piston P secured parallel in each end. The spool and extension slide up and down in a conforming housing H which is recessed around the middle of the inner wall. Into this chamber the side port is tapped. The ends of the spool chamber are ported and labeled INLET and the ends of the exhaust controlling piston chambers are ported and labeled PILOT. The pistons open the valve for exhausting.

The car is steered along the transverse runs by light from source 642 directed to one or more of three narrow vertical photoelectric cells 694, 695, and 696 having shielding partitions 698 extending perpendicularly from the boundary edges thereof whereby considerable vertical movement of the car does not change the relationship of the light reaching these cells. The output of each cell 694, 695, and 696 is amplified by amplifier 700, 701, and 702 respectively across whose outputs are connected to two-port normally closed solenoid valves 704, 705, and 706 to operate when cell 694, 695, and 696 receive light from lamp 642.

Valves 704, 705, and 706 control pilot valves 708 and 709 by connections from tank 246 to inlet of pump 148, and from the outlet of pump 148 by line T50, T to valve 704, to head end of the control cylinder of valve 708 and a T from line T50 to valve 706, to the head end of the control cylinder of valve 709. The control cylinders of valves 708 and 709 are exhausted to tank from the head end respectively each through a check valve 712 whose outlets are T'd to line T64 to valve 705, whose outlet is T'd to line T57, to T58, to tank 246. Check valves 712 prevent flow between the cylinders of valves 708 and 709. Valves 708 and 709 are spring returned two-position three-way pilot valves shown in normal position and control cylinder 674 during steering along the rows. Hydraulic connections are made from pump 148, line T50 with T's to the normally closed inlets of valves 708 and 709. Normally open exhausts of valves 708 and 709 are T'd together to line T66, to T57, to T58, to tank 246. When valve 708 is energized its piston is forced in opening passage from line T50 to line T68 to the inlet of a four-way pilot-controlled spring returned valve 714 which connects when energized (as shown) to the bottom inlet port of valve 716 and to the bottom pilot port of valve 717. When valve 709 is energized it connects line T50 to line T69 to the inlet of valve 714 which connects when energized to the bottom pilot port of valve 716 and to the bottom inlet port of valve 717.

When the casters are turned 180 degrees to make a return trip the effects of cells 694 and 696 must be reversed, that is the direction of steering must be reversed both at the truck and at the bump rail. Accordingly reverse valve 714 is provided to reverse flow from valves 708 and 709 before admission to cylinder 674. The position of valve 714 is controlled by a caster position cam valve 720 normally exhausting, which is opened to pressure by a caster lug 96*e*. Valve 720 is connected to pump 148 through line broken at *b* and to tank 246 through line broken at *a*. In the engaged position shown valve 702 connects pressure line *b* to the cylinder of valve 714. Valve 720 has semicircular member 721 secured to the end of its spool rod whereby it is opened when lug 96*e* is turned thereagainst through more than 90 degrees of the caster's movement. Lug 96*e* is so positioned on the caster that the steering control is reversed as the casters pivot while indexing at the truck and returned during the reverse swivel at the bump rail.

Light reaching cell 694 is amplified by 700 to operate valve 704 which then connects pressure to valve 708; and accordingly valve 708 is opened connecting pressure through reverse valve 714 positioned to correspond with the position of the casters, through the lower inlet port of the selective check valve connected by valve 714, and on to the required end of cylinder 674, thereby turning casters 664 so as to move the car upward on the drawing. Similarly light reaching cell 696 indicates that the car is too high on the sheet and controls the opening of valve 709 sending pressure to the opposite end of cylinder 674 to steer the casters to lower the car on the sheet. It should be observed that only one valve 708 or 709 is open at one time, since there is but one light source 642. If cells 694 and 696 receive the light cell 695 does also. When the middle cell 695 receives the light it exhausts the pilot cylinders of both valves 708 and 709 exhausting these valves, whereupon steering is not controlled. Whenever light reaches cell 695 the indication is that the car is on the beam.

The car is controlled to reverse its direction of movement when one-way jointed lever 724 on car 120*e* hits bump rail 626 opening three-way valve 726 normally held closed by spring 727 admitting fluid from pump 148 to the right-hand end of cylinder 674 through check valve 728 to move the piston of cylinder 674 to the opposite end, turning the casters approximately 180 degrees in a direction opposite to that taken for indexing whereby the rack is ready for another cycle of caster movement.

FIGURE 23 shows the cycle of movement of the car represented by a caster 664. The movement is limited by truck 630 and bump rail 626. Starting with position 1 at the bump rail the wheel leads the caster pivot to position 2 as guided by light source 642 through action of the steering controls. When baffle 650 blocks light 684 from reaching tube 680, cell 652 is energized by this light, initiating the indexing of the truck; and the index controls of the car are ineffective, since they try to force the casters to turn against the end of the piston travel causing the tiller to move down in FIGURE 24, causing light 642 to reach cell 694. When baffle 650 blocks light 685 from reaching tube 681 the casters are pivoted quickly (faster than the steering controls by adding restricting orifices 730 in lines T68 and T69 if necessary). The casters swivel clockwise until light 685 is blocked. If they have turned too much, past 90 degrees, light 684 is soon blocked by baffle 650 and the casters slowly returned because of restriction 692 to about parallel with track 624. The car is thus steered to keep the baffle between the lamps 684 and 685. The truck is properly timed so that it travels along with the car with baffle 650 always between arms 686 and 686'. When the truck has indexed the proper distance turn-limit-switch arm 612*e* opens switch 610*e* stopping the truck as switch 610*e* delayed by dashpot 613 closes. Since arm 612*e* supplies current to switch 610*e* while opening the switch, there is no steady state off position of the switch; and the truck is ready to index again when the dashpot 613 closes the switch, the dashpot being adjusted so that car 120*e* has time to leave the truck before the switch is closed. When cell 694 receives light from source 642, the casters having reached position 3 are slowly pivoted in the direction shown but fast enough compared to the speed of the car to move the car in toward the truck shielding light 685 dropping relay 687, energizing valve 691 to connect fluid to the left hand end of cylinder 674 (no line restriction) which pivots the casters quickly in the same direction. The casters cannot be pivoted too far because of the ends of the cylinder travel which permit caster rotation of over 180 degrees (about 200 degrees). As light 684 is blocked the casters slowly try to return as the car pulls away from the truck. The steering control valve 714 was reversed during the later part of the last index swivel and the car is guided by light from source 642 to position 4 where the bump rail initiates the swivel indicated by the semicircle. The revolving of the casters then brings the car closer to the bump rail when swiveling fast enough to maintain alignment of the car and guide light. Lever 724 can be easily backed off the bump rail if it drops over it by pivoting at its joint under the backward force of the bump rail.

Lever switch 732 opens the ignition circuit when it hits stop 186*e*.

Figure 25:
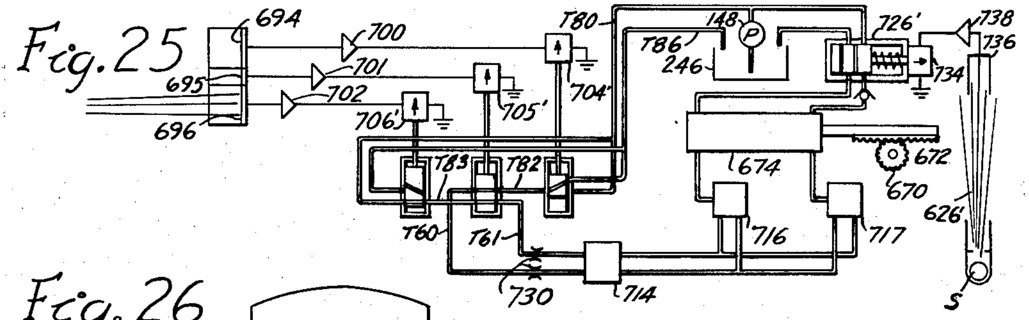
FIGURE 25 is a schematic diagram of a variation of a portion of FIGURE 24.

As shown in FIGURE 25, a beam of light 626' from source S can be substituted for the fence or bump rail 626 as a stop. Accordingly valve 726' is operated by a solenoid 734 connected to a photo-electric cell 736 preferably through an amplifier 738. Photoelectric cell 736 is shielded and positioned on the tiller to intercept the beam from source S which is positioned by the farmer to shine along the end of the area to be tilled.

FIGURE 25 also shows a variation of the photoelectric steering controls for the tiller. Connection is made from pump 148 to line T80 teeing to inlets of valves 704' and 706' blocked in normal position but connected to outlet lines T82 and T83 respectively when the valves are in energized position. Lines T82 and T83 are connected through valve 705' in normal position respectively to lines T60 and T61 which are connected as in FIGURE 24 to operate cylinder 674. Valves 704 and 706 connect respectively lines T82 and T83 to lines T-ing to line T86, to tank 246. Valves 704', 705', and 706' are connected each in a usual electrical circuit to be controlled by photoelectric cells 694, 695, and 696 respectively. When light energizes cell 694, valve 704' is lifted, connecting fluid from pump 148 through valve 705' when cell 695 is not energized to pressure the end of cylinder 674 to steer the tiller so that light will reach cell 695. When light energizes cell 696, valve 706' is lifted, connecting fluid from pump 148 through valve 705 when cell 695 is not energized to pressure the opposite end of cylinder 674 and exhaust the other end. When light energizes cell 695, valve 705' is lifted to block the flow and hold the piston of cylinder 674 in position. Orifices 730 again can be provided to control the speed of steering.

Figure 28:
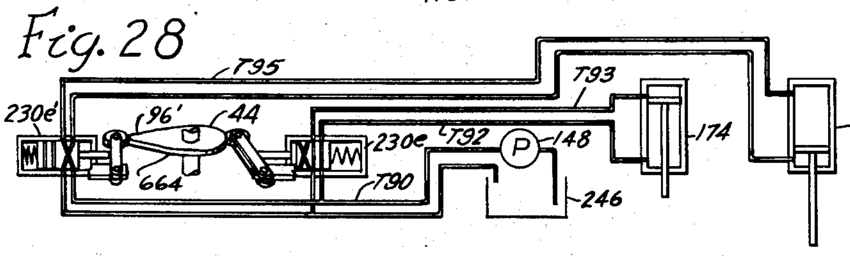
FIGURE 28 is a schematic diagram of the preferred hydraulic controls for the implement lift cylinders.

The preferred arrangement for automatically operating the implement lifts 170 and 170' pivotally secured to the bottom of car 120*e* is explained with aid of FIGURES 26 and 28. The circular base of a wheel bracket on a caster 664 has a lobe 96' for actuating four-way cam valves 230*e* and 230*e'* to control pressure to cylinders 174 and 174' respectively according to the swivel position of the casters. The cam valves are positioned on opposite sides of the swivel bracket so that valve 230*e* is actuated by lobe 96' when the vehicle is moving in the direction of the arrow in FIGURE 22 and so that valve 230*e* is actuated when the casters are reversed 180 degrees, that is when the vehicle is moving in the opposite direction. In the normal position of valve 230*e* shown connection is from pump 148, line T90, T-ing to inlet of valve 230*e* to line T92, to the rod (lift) end of cylinder 174, whose head is connected by line T93 to valve 230*e*, exhausting to line T94, to tank 246, to hold implement 178 lifted as the tiller moves to the right. In the engaged position of valve 230*e'* shown connection is from pump 148 to line T90, T-ing to the inlet of valve 230*e'* to line T95, to the head end of cylinder 174', whose rod end is connected by line T96 to valve 230*e'*, exhausting to line T94, to connect pressure to the lowering end of cylinder 174' to hold the plow or implement 178' in ground working position while the tiller moves to the right. When the tiller casters turn from right-angle movement or any other angle of tilling selected for operation between track 624 and stop 627 or 627' both implements are lifted.

Referring to FIGURES 26 and 27, the caster swivel brackets have an upper hollow tube 750 which rests on spring 751 pocketed to vertically slide in tube 752 and to turn therewith. Through this tube extends shaft 50 to drive the caster wheel preferably by beveled gear 68, secured to the bottom of shaft 50, engaging a beveled gear 754 formed as an integral part of the caster wheel concentric on one side thereof as shown. Shaft 50 is also splined to telescope on an upper hollow tube, shaft 50', on which is secured a drum or other drive means 49 for the caster wheel. Springs 751 improve the riding quality.

FIGURE 29 discloses the preferred system for transferring the steering of the tilling vehicle between the four-wheel swivel arrangement (all wheel steering) for automatic operation and the conventional front wheels only (or rear wheels only) and wheel steering arrangement. The front swivel casters FC are connected in alignment to turn together by chain 94 secured around the sprockets thereon. Likewise the rear swivel casters RC are connected together by chain 94' or other nonslip means. Beveled gears 760 and 760' secured to turn on the axis of and as an integral part of a front and a rear caster swivel respectively. Bevel gears 760 and 760' engage respectively beveled gears 762 and 762' on the same side thereof. Gears 762 and 762' are respectively connected by spur gears or other nonslip means 763 respectively to shafts 764 and 764', which shafts are aligned and supported in bearings to the frame of the tiller (either bridge 30 or car **120*e* for example). A two faced clutch 770 is splined for axial movement on shaft 764' and actuated by shift yoke and lever 772 to engage the frame of the tiller when the clutch is moved to the rear or to engage shaft 764, preferably through clutch 776 secured on shaft 764, when clutch 770 is moved to the front of the tiller. A steering wheel 778 is connected by chain and sprocket or other suitable power transmission means 780 to turn shaft 764 to steer the vehicle manually. One or more pins and holes 774 in the faces of clutches 770 and 776 are positioned to engage only when the front and rear wheels are aligned for forward operation of the vehicle. One or more pins and holes (including some of the same ones 774) in the frame and in clutch 770 are positioned to engage only when the rear wheels are aligned for forward operation of the vehicle. A dial 784 turned with the steering wheel 778 indicates when the front wheels are straight for shifting from two wheel steering and vice versa. The ratio of the gearing between shafts 764 and 764' and each caster is equal so that casters turn substantially equally when turned. Gear 668 is now secured on shaft 764'** for automatic steering only when the four-wheel steering is engaged.

Having thus described a few embodiments of my invention which can have many variations it is to be understood that I do not wish to be limited to only variations shown and described herewith but I contemplate to cover in the appended claims all modifications and variations which fall within the true spirit and scope of my invention.

I claim as my invention:

1. An automatic tilling vehicle comprising a bridge, swivel casters supporting each end of the bridge, a track on said bridge along the length thereof, an implement car on the track, a cable drive having an endless cable on said bridge for pulling said car back and forth across the bridge, clutch means on said car for holding either running side of said cable drive to cause the cable to pull the car in either direction or permit the car to stop, a lever for controlling said clutch means, said lever having a forward, reverse and neutral position, two linkage rails spaced apart running along the length of the bridge on opposite sides of an arm of said lever, parallel arms pivotally supporting said linkage rails to said bridge to enable movement of said rails toward and away from each other, means for moving and biasing said lever means toward either said linkage rail according to the direction of travel intended for said car, means engaged by said car at an end of said bridge to propel said bridge at an angle to its length while said car is at that end of the bridge, means on each end of the bridge to throw said lever into neutral to stop said car, means engaged by movement of the bridge to reverse said biasing means to start said car in reverse, means to guide the bridge along its angle of travel, means at ends of travel for the bridge for reversing the bridge, selective means to control said bridge to continue to run, row locators on said linkage rails for actuating said lever to stop said car intermediate the ends of said bridge while said bridge operates, means controlled by movement of said bridge for separating said linkage rails to start said car so that said car can index to the next row locator, whereby the implement car can cover ground in a series of rows and then be set to cover the ground in a series of crossrows.

2. An automatic tiller comprising a bridge, swivel wheel units supporting each end of the bridge, a track on said bridge along the length thereof, an implement car on the track, a cable drive having an endless cable on said bridge for pulling said car back and forth across the bridge, means on said bridge to separately propel said bridge and said cable, clutch means on said car for locking either running side of said cable to the car to pull the car in either direction or permit both sides of the cable to pass to stop the car, reversible biasing means for engaging said clutch means with either side of said cable loop, means on each end of said bridge to move said clutch into neutral position to stop said car, means engaged by said car at an end of said bridge to propel said bridge at angles to its length while said car is at that end of the bridge, means engaged by movement of the bridge to reverse said biasing means to start said car in reverse, whereby said car is given back and forth and indexing movement, and means for guiding the bridge.

3. A tractor which comprises in combination a frame, a plurality of swivel casters supporting said frame, a motor for operating said tractor, power transmission means for connecting said motor to drive said casters for propelling said tractor, the wheels of said casters being aligned in the same direction for tilting, steering means connecting said casters to turn together, means for steering, said casters being free to rotate over 180 degrees, means responsive to a light beam for controlling said last named means to steer the tractor to follow said beam of energy, an energy source for directing said beam to said light beam responsive means, means for positioning and moving said source to guide said tractor in parallel rows, means for automatically swiveling said casters after a predetermined travel of said tractor to reverse said tractor, and means for reversing the steering control when the casters are reversed so that steering is controlled for movement in both directions on the energy beam.

4. A tilling system which comprises in combination, a first vehicle, a second vehicle adapted to support earth working implement means, guide means extending along the field for guiding said first vehicle, means carried by said first vehicle for guiding said second vehicle along a line at an angle with respect to the line of movement for said first vehicle, means for indexing said first vehicle a predetermined distance along the field, means carried by said second vehicle for substantially stopping the component of movement of said second vehicle which is in a direction at right angles to said guide means, means carried by said first vehicle for actuating said last mentioned means by movement of said second vehicle at an end of its travel at an angle to said guide means, means on said second vehicle for reversing the movement of said second vehicle, means to actuate said last mentioned means to reverse said vehicle at each end of travel of said second vehicle, and means controlled by movement of said first vehicle for delaying operation of said last mentioned means while said first vehicle is indexing.

5. A system for automatic tilling which comprises in combination a first vehicle, a second vehicle adapted to support earth working implement means, means for propelling each said vehicle, first guide means extending along a field to guide said first vehicle along the field, second guide means including means carried by said first vehicle for guiding said second vehicle at an angle with respect to said first guide means along a path determined by the position of said first vehicle, third means on said second vehicle to reverse the movement of said second vehicle, means for reversing the direction of said second vehicle after a predetermined travel away from said first vehicle, control means for stopping movement of said second vehicle at a point along said angle of movement in the opposite direction of travel, means for indexing said first and second vehicles together a predetermined distance parallel to said guide means after said second vehicle reaches the point whereat said control means substantially limits further movement of said second vehicle along the angle, means actuated by movement of said first vehicle for stopping movement of said first and second vehicles parallel said guide means and for actuation of said third means to reverse movement of said second vehicle along said angle whereby said second vehicle covers an area with back and forth indexing movements over a predetermined path having as many movements as desired, a first implement lift and a second implement lift on said second vehicle, a directional tilling implement connected oppositely to each implement lift to till in opposite directions with alternate implements, a cylinder for actuating each said lift, a pressure source, a reverse valve for connecting said source to the lift ends of either cylinder according to the position of said valve, and means engaged by movement of said second vehicle for reversing said valve at each end of travel of said second vehicle to lift alternate implements on successive runs of said second vehicle and for lowering alternate implements for alternate operation depending on the direction of travel.

6. A tilling system including in combination, a track along one side of an area to be tilled, a control truck on said track, an implement car including swivel casters for supporting said car on the ground, means for driving said casters to propel said car, steering means connecting the casters to swivel together through more than 90 degrees each side of a position parallel said track, guide means on said truck for providing a radiant beam to guide said car, and means on said car controlled by said beam for controlling said steering means according to the position of the car relative to the beam to keep the car on the beam, means for reversing said car in each direction controlled by movement of said car, and means for indexing said truck controlled by movement of said car whereby said car runs back and forth and indexes to till parallel rows while the wheels of said casters rotate in one direction.

7. In a tilling system a guide vehicle, means for moving said guide vehicle in indexing movements, a tilling vehicle, means for propelling said tilling vehicle, means for guiding said guide vehicle along one side of an area to be tilled, a source of light on said guide vehicle for directing a beam at an angle to the line of travel of said guide vehicle for guiding said tilling vehicle, steering means on said tilling vehicle and means for controlling said steering means to follow the light of said source, means to reverse the travel of said tilling vehicle after a predetermined travel from said guide vehicle, and light controlled means for indexing said first and second vehicles together whereby said tilling vehicle continuously moves back and forth on said angle and indexes to cover the area of ground.

8. On a tiller which turns back and forth over an area to be tilled a first implement lift and a second implement lift on said tiller each including a cylinder, circuit means for pressuring said cylinders, a right-hand plow connected to be supported by said first lift and facing one direction of movement of the tiller, a left-hand plow connected to be supported by said second lift and facing the opposite direction from said right-hand plan, a reverse valve connecting pressure to the lifting end of either said cylinders according to the position of the reverse valve, means controlled by movement of said tiller to reverse said valve at each end of travel of said tiller to lift and release alternate plows for operation depending on the direction of travel.

9. In a tilling system in combination at least three rails widely and equally spaced apart and individually secured with respect to the ground, a bridge spanning adjacent rails, grooved wheels on said rails under each end of said bridge and means swivelly supporting said bridge on said wheels, drive means for propelling said bridge through said wheels, crossover tracks at ends of said rails, said crossover tracks being a continuation of said rails and including switch means on said rails whereby said bridge as guided by said rails is moveable from one run to the adjacent run with said wheels rotating in one direction, means including an implement lift for attaching an implement to till the ground, and means to automatically actuate said lift to raise the implement to clear said rails as the bridge crosses from one run to another.

10. In a combination as claimed in claim 9, said crossover tracks having curves which turn the casters before the implement reaches the crossover tracks, said means for actuating the implement lift being controlled by the swivel position of the casters, implement lift means and power means for operating said lift means, control means operated by the turning of said casters to control said power means to lift whenever said casters are substantially turned from the direction of tilling.

11. In combination on an automatic tilling system having an implement vehicle which moves back and forth over a field, two implement lifts on the vehicle each having a lift cylinder, a reversing valve and fluid circuit means alternately connecting pressure to lift said cylinders whereby one said cylinder at a time is pressured to lift and the other connected to exhaust to lower, means engaged at the ends of travel of said vehicle to reverse said reversing valve, check valves in said circuit means to block the exhausting of said cylinders, bypassing valves connected across said check valves, and means controlling said bypassing valves to open when the tiller is aligned for tilling whereby either cylinder can lower depending on the position of said reversing valve.

12. In the combination claimed in claim 11 said bypassing valves beign dual-pilot-pressure controlled wherein pressures to one port thereof closes the valve irrespective of pressures to the other control ports thereof.

13. On a bridge tiller an implement lift control for insuring that the implements are lifted while the tiller is turned from wide gauge and which comprises, a linkage rail extending along the length of the bridge, parallel linkage arms pivotally supporting said linkage rail to said bridge in a parallelogram arrangement to enable movement of said rail to parallel positions, a cylinder connected to position said rail, an implement car on said bridge, a valve on said car controlled by said rail and connected to control the implement lift, and means for actuating said cylinder responsive to movement of said bridge from wide gage to narrow gage.

14. In combination, a first and a second object arranged for guided and limited relative movement, a control linkage on said first object having a linkage rail along the direction in which the objects have relative guided movement and means for mounting said rail to said first object to move said rail to parallel positions thereon, a control lever for said second object pivoted to said second object to ride on said linkage rail as said second object moves along said first object, means to move said linkage rail in parallel positions for controlling said lever to control said second object.

15. A tiller having in combination a bridge-like frame, a truck for supporting one end of said frame, said truck having a swivel with substantially vertical axis about which said frame can rotate, first wheels for propelling and supporting said truck and wheels for supporting and propelling the other end of said frame, a shaft having its axis through and at right angles to the axis of said swivel, two driven beveled gears secured to said shaft with the vertex of their pitch cones on the axis of said truck swivel, drive means rotatably connecting said shaft with said first wheels and a drive mounted on said frame having beveled gear means for driving either of said driven beveled gears according to the position of said truck, whereby power to said truck is off when it swings from a given direction and is reversed when the direction of the bridge is reversed by pivoting on said truck.

16. A farming vehicle which comprises; a frame, swivel casters supporting said frame, power means and power transmitting means connected to the wheels of said casters to propel the frame, automatic means for steering and guiding said casters to turn together to steer said frame, means for steering the casters at one end manually, means for locking the casters at the opposite end with their wheels parallel the sides of the frame, and a clutch for transferring from manual to automatic steering, means on said frame for supporting an implement in operable relation with respect to the ground.

17. In combination, a frame, a swivel caster supporting a portion of said frame, an implement lift supported on said frame, a cam connected to turn with the swivel bracket of said caster, power means for operating said implement lift, said power means operated by said cam to operate said lift when said caster is turned from a particular position relative to said frame, whereby a change of direction of said frame from that selected for operation of the implement supported lifts the implement.

18. An automatic farming system which comprises in combination: a tilling vehicle and a control vehicle on a field to be tilled, means for guiding said control vehicle along one side of the field, means for emitting an energy beam from said control vehicle along a line on which said tilling vehicle is to operate, first drive means for moving said control vehicle in steps to index the beam for tilling parallel rows, control means for initiating the index of said control vehicle upon approach of said tilling vehicle casters supporting said tilling vehicle, steering means for turning said casters together through over 180 degrees of arc, second drive means for driving said casters to propel said tilling vehicle, means on said tilling vehicle for receiving said beam and for controlling said steering means to guide said tilling vehicle to follow the beam, and to index with said control vehicle, means to turn said casters 180 degrees after a predetermined travel to reverse said vehicle, means controlled by the swivel position of said casters for reversing said steering control when said casters are reversed to keep said vehicle on the beam when operating in either direction.

19. In a system as in claim 18, means for indexing said control vehicle only when said tilling vehicle is adjacent thereto.

20. In a system as in claim 18, means for manually steering casters at one end of said tilling vehicle, and means for locking the casters at the opposite end parallel to the sides of the tilling vehicle for operation to and from the field.

21. In a system as in claim 18, two implement lifts on said tilling vehicle, a lift cylinder for operating each said lift, pressure means for operating said cylinders, cam valve means for controlling said pressure to said cylinders, cam means on a said caster for controlling said valve means to lower alternate lifts only when said casters of the tiller are aligned for tracking in opposite directions.

22. An automatic tiller having front and rear swivel wheels, means including a shaft connecting the front and rear wheels to turn together, said shaft being in two lengths, a clutch for connecting said lengths, said clutch having means for engaging only when the wheels are aligned and means engaged by the clutch when disconnected to free the forward said shaft and to lock the rear said shaft only when the wheels are aligned straight ahead, and a steering wheel connected to turn the front wheels, an automatic steering control connected to turn the rear shaft, said automatic steering control being locked out when the rear shaft is locked by said clutch.

References Cited by the Examiner

UNITED STATES PATENTS

| | | | |
|---|---|---|---|
| 1,064,774 | 6/13 | Romine | 180—45 |
| 1,291,969 | 1/19 | McFarland | 172—215 X |
| 1,324,937 | 12/19 | Smith | 104—169 |
| 1,394,651 | 10/21 | Tompkins | 172—24 |
| 1,512,821 | 10/24 | Curton | 172—26 |
| 1,601,944 | 10/26 | Davidson et al. | 172—215 X |
| 1,638,754 | 8/27 | Szuchy | 246—187 |
| 1,702,018 | 2/29 | Raulais | 172—26 |
| 1,743,961 | 1/30 | Ford | 172—215 X |
| 2,109,475 | 3/38 | Fanning | 180—82 |
| 2,216,575 | 10/40 | Seinfeld et al. | 180—82 |
| 2,339,291 | 1/44 | Paulus et al. | 180—79.1 |
| 2,611,442 | 9/52 | Thomas | 180—6.2 |
| 2,651,248 | 9/53 | Ballu. | |
| 2,791,167 | 5/57 | Lockmiller | 180—6.2 |

ABRAHAM G. STONE, *Primary Examiner.*

A. JOSEPH GOLDBERG, *Examiner.*